United States Patent
Mittelstaedt et al.

(10) Patent No.: US 12,087,086 B2
(45) Date of Patent: Sep. 10, 2024

(54) METHOD FOR IDENTIFYING, ORDERING, AND PRESENTING IMAGES ACCORDING TO EXPRESSIONS

(71) Applicant: Kodak Alaris Inc., Rochester, NY (US)

(72) Inventors: Brian E. Mittelstaedt, Rochester, NY (US); Joseph Manico, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 26 days.

(21) Appl. No.: 15/976,449

(22) Filed: May 10, 2018

(65) Prior Publication Data
US 2018/0330152 A1    Nov. 15, 2018

Related U.S. Application Data
(60) Provisional application No. 62/504,932, filed on May 11, 2017.

(51) Int. Cl.
G06V 40/16    (2022.01)
G06F 18/2113  (2023.01)

(52) U.S. Cl.
CPC ........ *G06V 40/167* (2022.01); *G06F 18/2113* (2023.01); *G06V 40/171* (2022.01); *G06V 40/174* (2022.01)

(58) Field of Classification Search
CPC ........... G06K 9/00261; G06K 9/00281; G06K 9/00302; G06K 9/623; G06V 40/167; G06V 40/171; G06V 40/174
See application file for complete search history.

(56) References Cited

U.S. PATENT DOCUMENTS

| | | | |
|---|---|---|---|
| 9,369,625 B2 | 6/2016 | Stubler et al. | |
| 10,191,920 B1* | 1/2019 | Grundmann | ....... G06K 9/00302 |
| 2004/0101178 A1* | 5/2004 | Fedorovskaya | .......... H04N 1/32 |
| | | | 382/128 |
| 2006/0115157 A1* | 6/2006 | Mori | .................... G06V 40/174 |
| | | | 382/118 |

(Continued)

FOREIGN PATENT DOCUMENTS

| | | | | |
|---|---|---|---|---|
| CN | 101620669 | * | 1/2010 | ............... G06K 9/00 |
| CN | 106709402 | * | 5/2017 | ............. G06F 21/32 |

(Continued)

OTHER PUBLICATIONS

International Search Report and Written Opinion mailed Sep. 10, 2018 in PCT/US2018/032076.

(Continued)

*Primary Examiner* — Zhiyu Lu
(74) *Attorney, Agent, or Firm* — HOGAN LOVELLS US LLP

(57) ABSTRACT

Embodiments are directed to digital image processing, storage, retrieval, and presentation systems and methods for ordering and ranking visually perceivable facial expressions identified within the selected set of digital images. In addition, arranging for presentation the ordered and ranked set of digital images in response to a user-selection of an emotional expression or range of emotional expressions and presenting the selected arranged set of digital images on a display device.

15 Claims, 14 Drawing Sheets

(56) References Cited

U.S. PATENT DOCUMENTS

| | | | | |
|---|---|---|---|---|
| 2006/0198559 | A1* | 9/2006 | Manico | H04N 1/00132 382/305 |
| 2007/0183634 | A1* | 8/2007 | Dussich | G06K 9/00295 382/118 |
| 2008/0201144 | A1* | 8/2008 | Song | G06V 40/175 704/236 |
| 2010/0086204 | A1* | 4/2010 | Lessing | G06F 16/58 382/165 |
| 2011/0141258 | A1* | 6/2011 | Song | G10L 17/26 348/E7.085 |
| 2012/0314962 | A1* | 12/2012 | Holland | G06F 16/583 382/218 |
| 2014/0098174 | A1* | 4/2014 | Summers | G06K 9/6255 348/14.1 |
| 2014/0192134 | A1* | 7/2014 | Jung | H04N 21/41407 348/14.02 |
| 2015/0036934 | A1* | 2/2015 | Movellan | G06K 9/4671 382/197 |
| 2015/0178915 | A1* | 6/2015 | Chatterjee | G06F 16/58 382/128 |
| 2015/0242707 | A1* | 8/2015 | Wilf | G06K 9/6256 382/159 |
| 2016/0224871 | A1* | 8/2016 | Koren | G06K 9/6284 |
| 2017/0032485 | A1* | 2/2017 | Vemury | G06Q 50/265 |
| 2017/0270970 | A1* | 9/2017 | Ho | G06F 16/583 |
| 2018/0114057 | A1* | 4/2018 | Kim | G06K 9/624 |

FOREIGN PATENT DOCUMENTS

| | | | | |
|---|---|---|---|---|
| CN | 106709804 | * | 5/2017 | G06F 21/32 |
| CN | ZL 2018800311219 | | 2/2024 | |
| EP | 1650711 A1 | | 4/2006 | |

OTHER PUBLICATIONS

Dhall et al., "The More the Merrier: Analysing the Affect of a Group of People in Images," 2015 11th IEEE International Conference and Workshops on Automatic Face and Gesture Recognition (FG), IEEE May 4, 2015, pp. 1-8.

Dhall et al., "Automatic Group Happiness Intensity Analysis," IEEE Transactions on Affective Computing, IEEE, USA, vol. 6, No. 1, Jan. 1, 2015, pp. 13-26.

Communication Pursuant to Article 94(3) EPC mailed Jul. 24, 2023 in European Application No. 18 732 973.5.

Notification of the First Office Action issued in CN Application No. 2018800311219 issues on Mar. 14, 2023.

* cited by examiner

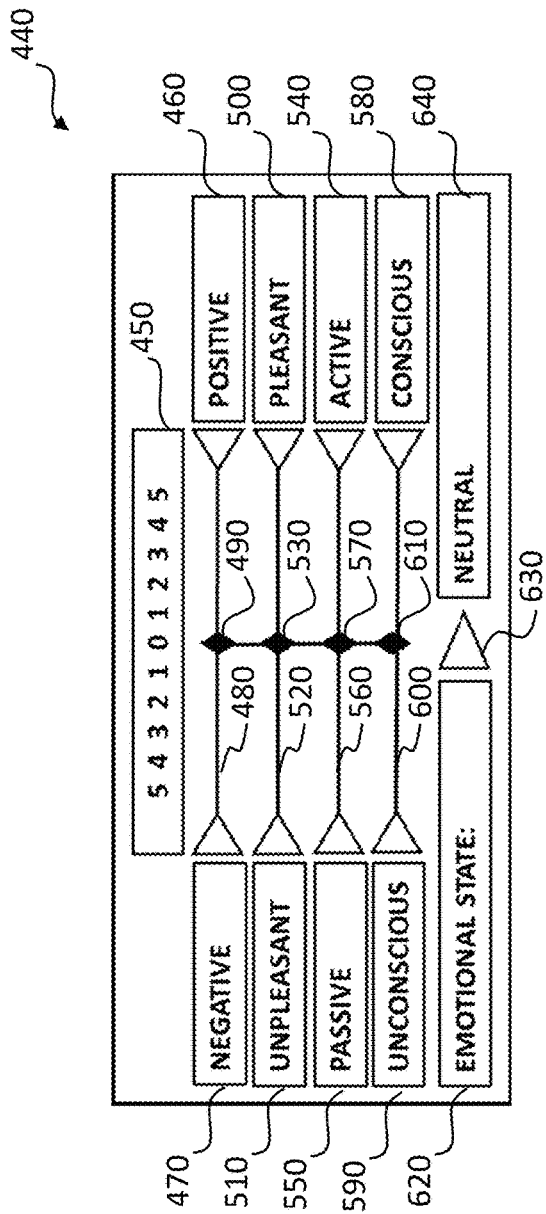
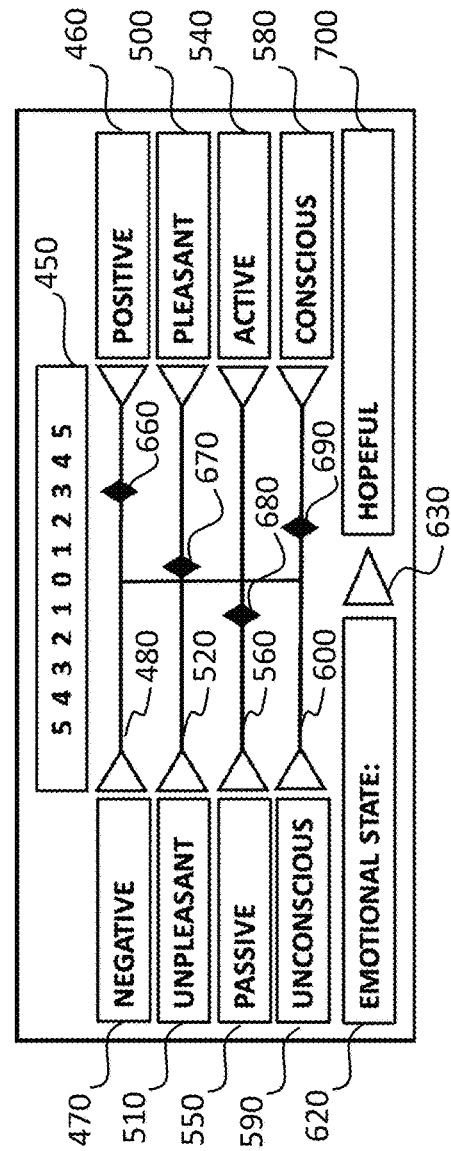
FIG. 8A
FIG. 8B

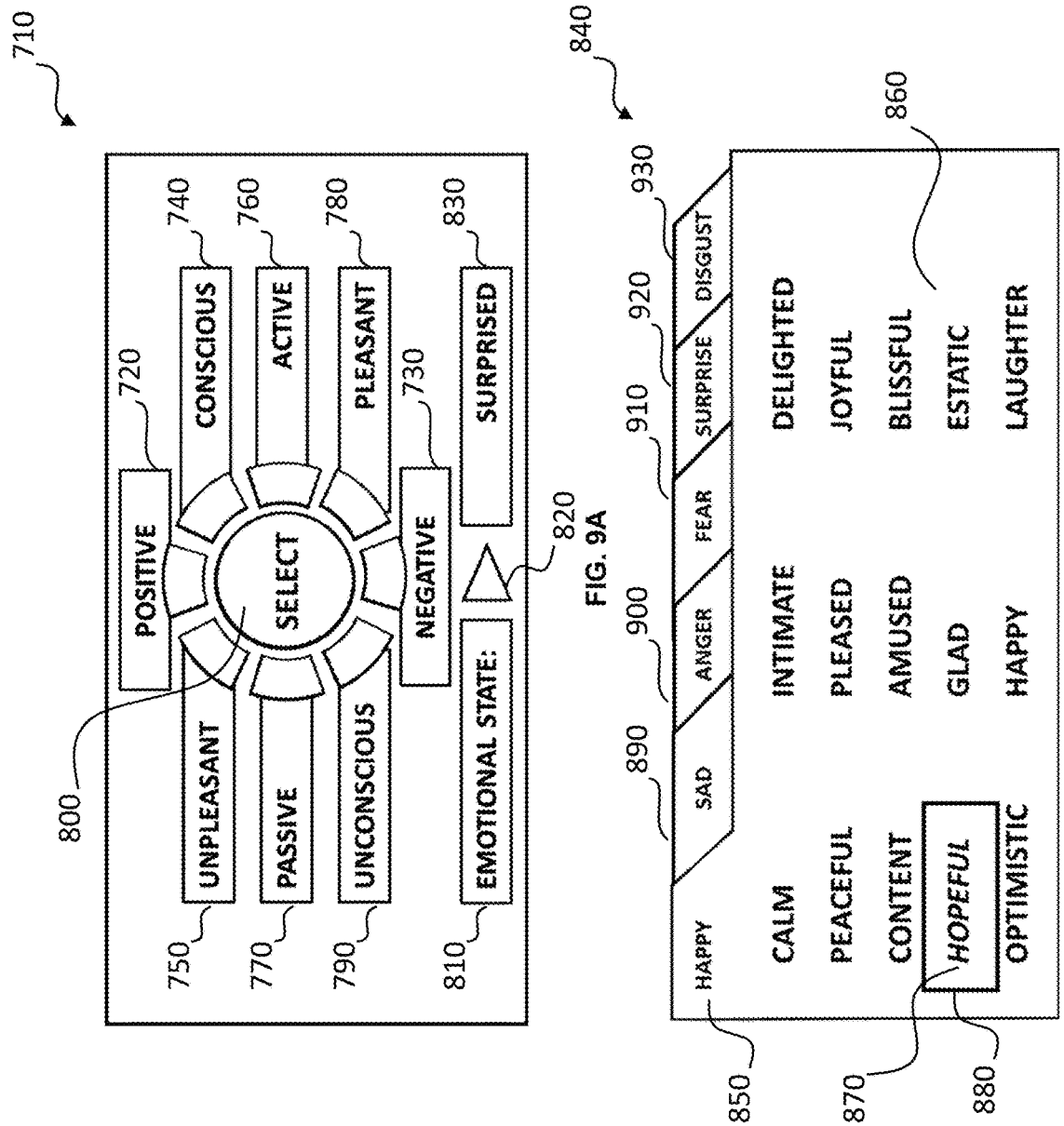

METHOD FOR IDENTIFYING, ORDERING, AND PRESENTING IMAGES ACCORDING TO EXPRESSIONS

CROSS-REFERENCE TO RELATED APPLICATIONS

This application is a non-provisional of, and claims priority to, U.S. provisional application No. 62/504,932, filed on May 11, 2017.

FIELD OF THE INVENTION

This invention pertains to multimedia identification, ordering, and presentation methods, systems, software, and product distribution media. A particular embodiment of the present invention automatically orders, sorts, and presents a set of digital still or video imagery based on facial expressions of the subject of the imagery.

BACKGROUND OF THE INVENTION

The advent of digital cameras with high resolution display and video recording capabilities such as; 4K, Ultra HD, Ultra-High Definition, increased frame capture rates, and still photo "burst modes" now allow consumers to generate hundreds of high quality still images in a few seconds. This technology and approach competes with and may soon supplant conventional 'still' photography as a popular image capture modality. The need to actuate a shutter button at the correct moment in time to capture the intended image or expression has evolved into imaging devices in which the scene will be captured in high-resolution video or still image burst mode and the desired still image or video sequence can be selected post capture. In addition, with the proliferation inexpensive "cloud based photo storage," users can automatically upload all of the images taken and/or stored by their array of personal digital devices including: phones, tablets, still and video digital cameras, memory cards, portable hard drives, computers, and the like. Furthermore, online and retail movie film and videotape digitization services, photo print, slide, and negative scanning services, as well as inexpensive home photo scanners, have also provided additional volumes of digital photos and videos to these collections often with little or no organization scheme or context. Users now accumulate vast collections of photos and videos spanning decades including the thousands of images of individuals expressing the full range of human emotions.

Currently, consumers struggle with the effective use, categorization, and curation of images to allow the retrieval, sharing, and creative repurposing of their images. With the addition of high resolution digital video recording, the volume of imagery will continue to grow along with the challenges of use as well as the possibility of more creative applications. There remains a need in the art for a system that is capable of organizing, ordering, and presenting a series of digital images, particularly a system where the images can be ordered and presented in a manner sensitive to the visual, semantic and emotive nature of the image content, each with a potentially different form.

Further, when taking photos of people, capturing the desired pose and expression are critical elements and creative motivations for the photographer and subject. With crowded, dynamic scenes such as with sporting events, wedding receptions, celebrations, or taking photos of precocious young children, capturing the desired pose and expression can be a challenge. By extension, a range of actions and or expressions may be desired to later use in creative applications, such as collages, posters, flip books, lenticular motion prints, interactive video applications, emojis, avatars, and the like. However, identifying different poses and expressions, aligning, and re-sequencing thousands of individual frames would be an arduous, time-consuming task that is prone to subjective mischaracterization of expressions leading to inaccurate curation of expressions and experiences.

SUMMARY OF THE INVENTION

According to the present invention a digital image processing system, comprising a means for ordering and ranking visually perceivable facial expressions identified within a selected set of digital images. The system is configured to identify and group similar human faces for one or more individuals and for each group of the similar human faces, presenting the ordered and ranked set of digital images in response to a user-selection of an emotional expression or range of emotional expressions. The system being configured to order and rank the visually perceivable facial expressions by at least one of an emotional vector including: active-passive, pleasant-unpleasant, positive-negative, and/or conscious-unconscious. The system being configured to measure and analyze the relative positions, orientations, and shapes of: eyes, eye brows, eye lids, forehead/brow, nostrils, tongue, lips, teeth, and/or mouth. The system being configured to arrange the ordered and ranked image set for presentation in response to the user-selected emotional expression or range of emotional expressions and present the selected arranged set of digital images on a display device.

BRIEF DESCRIPTION OF THE DRAWINGS

FIG. 8A illustrates an exemplary user interface depicting a neutral emotional expression/state across various emotional vectors according to an embodiment of the present invention.

FIG. 8B illustrates an exemplary user interface depicting a hopeful emotional expression/state across various emotional vectors according to an embodiment of the present invention.

FIG. 9A illustrates another exemplary user interface depicting a surprised emotional expression/state across various emotional vectors according to an embodiment of the present invention.

FIG. 9B illustrates another exemplary user interface depicting a hopeful emotional expression/state across various emotional vectors according to an embodiment of the present invention.

DETAILED DESCRIPTION

Figure 1:
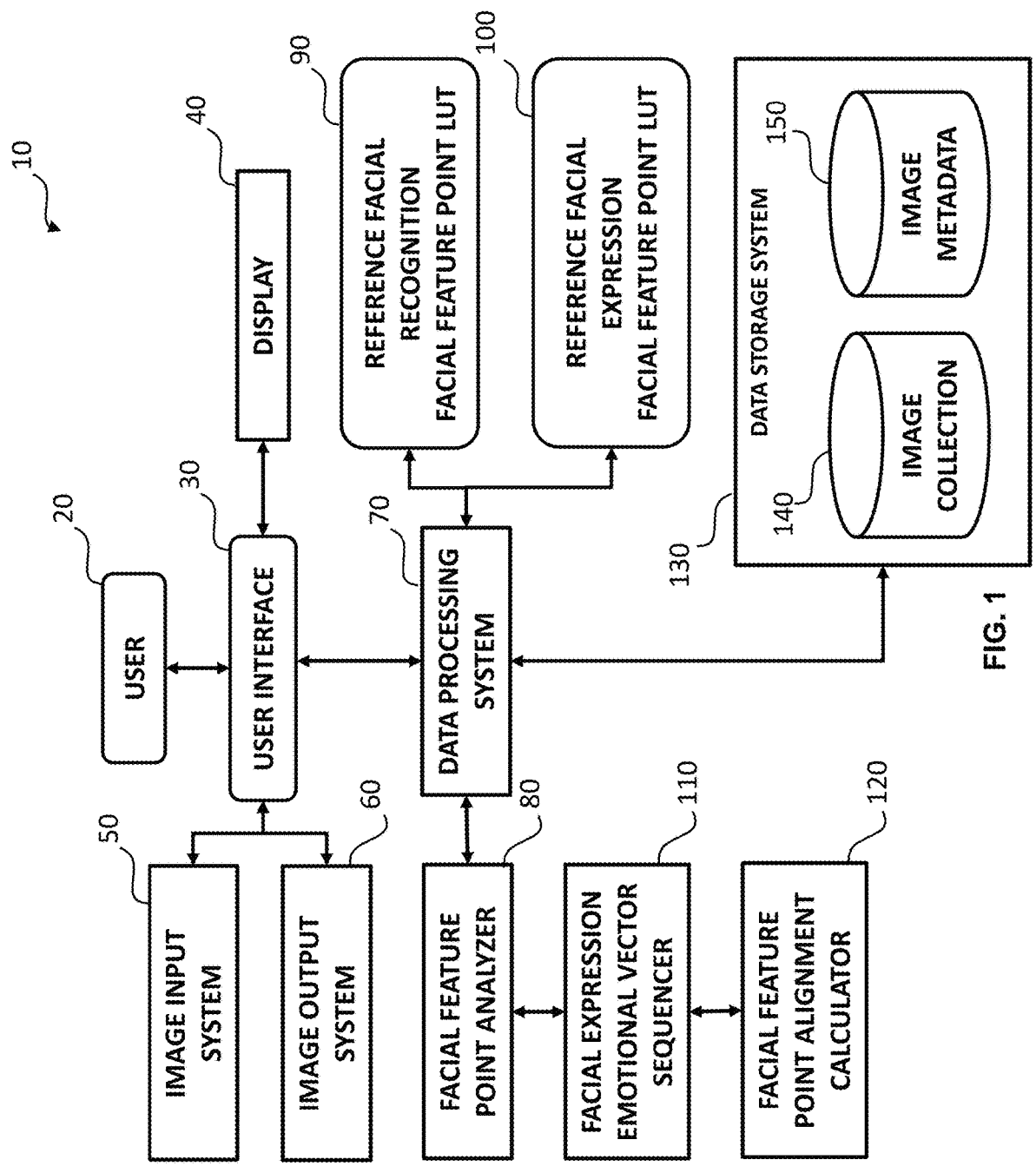
FIG. 1 illustrates a block diagram of a system of an embodiment of the present invention.

The invention is inclusive of combinations of the aspects of the present invention described herein. References to "a particular aspect" and the like refer to features that are present in at least one embodiment of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The invention relates to the automated categorization, sizing, orientation, and ordering of the frames in burst sequence, video recording, image collection, and/or live capture system. A system capable of ingesting video sequences, a large sequence of still images, or the contents of a personal photo collection, characterizing their relative quality, analyzing and categorizing the emotional expressions of the subjects and gross anatomical metrics (eyes open, gaze direction, mouth open, subject direction, head orientation, limb positions, posture). In addition, the re-sequenced individual frames can be individually aligned to a selected or referenced frame in order to establish aligned and re-sequenced images along emotional vectors. Emotional granularity for a given emotional vector is established by the amount and variety of images that are available. Images with various emotional states being expressed are grouped along relevant emotional vectors and can be ranked by intensity and type over an entire collection or separated into subgroups by time, location, event relationship to other individuals, by other individuals in the same scene, or at the same event.

It is well known in the art to detect facial features in images such as eyes, eye gaze, mouth, nose, etc. Typical analyses of the features include whether eyes are open, head orientation, degree of smile, etc. Analytical techniques suggest the possibility of finer categorization allowing for more specific emotional states to be discerned such as happy, bemused, gleeful, laughing, smiling, sad, angry, confused, distressed, fatigued, manic, etc. The present invention uses a computer processor to order and rank visually perceivable facial expressions identified from an individual or individuals depicted in the images within a selected set of digital images characterized by at least one type of emotional state. For example, the emotional states may be categorized across one or more emotional vectors including active-passive, pleasant-unpleasant, positive-negative, and/or conscious-unconscious. In addition, the ordered and ranked individual images including at least one human face may be re-sequenced and/or reordered in response to a user-selection of an emotional expression or range of emotional expressions for presentation or display.

The present invention also provides processing means to realign the facial content, such as using digital image magnification, reduction, rotation, and/or cropping to match and align the ocular distance of faces from image to image to enhance the esthetic and functional nature of the individual images for user interface navigation applications and dynamic and static presentations.

Additionally, an individual recorded emotional expression can be modified with digital editing tools, to change the expressed emotion of an image. In addition, third-party, professionally-produced content can be provided to augment the presentation of selected images by matching the emotional intent of the expression. For example, a photo of young child contemplating a flower may be further enhanced by adding a soft focus vignette and a floral styled border. Such as a photo of a young boy flexing his muscles and making an angry face may be colorized and digitally modified so that the child's skin tone is "green" and "The Hulk" graphics and text is provided. Accordingly, emotional states may have character templates and/or emotional templates that may be matched to expressions to allow for digital editing of the subject matter in the image.

Embodiments of the present invention provide users with the ability to select images that represent a selected emotional expression from a spectrum of least one emotional vector, set, or condition characterized by a negative, neutral, and positive emotional state as well as active or passive, pleasant or unpleasant, and/or conscious or unconscious condition. The range of emotions for a given emotional set has a granularity that describes individual incremental states determined from the computer analysis of facial feature points, a look up table to convert feature point positions into indications of emotional states, and the individual expressions available from the selected set of images. In a live capture system, the range of emotional states may be determined to be below a user selected or pre-determined threshold for a given range of emotional conditions.

Alternatively, the user, who can be any combination of photographer and/or subject such as with "selfie" type photography, may be attempting to record a specific emotional expression or for supplementing or creating a high granularity range of emotional expressions. The system provides a real-time implementation of embodiments of the present invention that intervenes and instructs the user, with a visual graphic, animation, example, text, and/or audio message inclusive of the traditional, "smile" or "say cheese", but goes beyond with more specific instructions like; "smile more", "tilt your head slightly to your left", "wink", "frown", "laugh", and/or raise one eyebrow. In addition, the system can provide statements designed to elicit an emotional response such as; "remember your first day at school", "show me your angry face", "no one loves you", "you are beautiful", "have you gained weight?", "think of warm sunshine on your face", and so forth in order to suggest or elicit additional or specific emotional expressions. Because the system is monitoring the user's reactions to suggestions, it can record or tag images that capture the appropriate expression, and provide additional audio and/or visual feedback such as, "that's it", "perfect", "looks good", and so on or if the camera display is visible to the user as with a selfie, a text message or a graphic image such as a "thumbs up" can be provided as an indication that the appropriate expression has been recorded. If the GUI is used it can also include a real-time image stream of the user with graphics highlighting or pointing to the user's/subject's relevant feature points and suggest how the user can modify their expression to conform to their selected expression. Once the user presents the desired expression, the image is recorded, or if all of the streamed images are being recorded, the appropriate images are tagged or otherwise associated with an indication of the expression. Expressions are determined by detecting and measuring facial feature points as described in reference, U.S. Pat. No. 9,369,625 "SYSTEM FOR PRODUCING COMPLIANT FACIAL IMAGES FOR SELECTED IDENTIFICATION DOCUMENTS," which is hereby incorporated by reference in its entirety for all purposes.

The user is presented with an option for an interactive GUI and/or automatic facial feature reshaping and modifying option in order to increase the emotional granularity of a given set of facial expressions or to create a specific expression or range of expressions. Multiple images are digitally blended or feature points are warped to create the desired emotional expression. The user can choose to accept, reject, or modify the digitally altered images with the provided GUI. In addition, digitally amplifying or muting emotional expressions, by remapping or blending facial feature points, can be accomplished to support various applications such as adjusting expressions to suit an intended audience or event for still and video images. In a pseudo-real-time application such as with a Skype video chat, the image stream can be modified, between when it is recorded and when it is presented to the other participants on the video chat with minor delays that are consistent with streaming media applications. The presenting individual or individuals are provided with a GUI to indicate or "dial in" a desired emotional expression or range of emotional expressions. In the case of multiple faces in an image a "harmony" metric can be used to normalize the presented expression toward an intended emotional expression. Whether deployed in a real-time video chat, still and video recordings, or existing image collections, the present invention allows the user to manage emotional homogenization, harmony, variety, and/or excitement. The ability to select and/or digitally modify expressions provides a selectable variance of emotional displays to make an individual, individuals within a group, or entire groups of individuals. This can be done to harmonize or randomize a groups' emotional expressions for formal photographs, humorous, or artistic applications. Alternatively, if the user appears disengaged or overly emotional in midst of video chat session the system can discreetly alert the user, with a screen graphic or text that they should; "look more attentive", "look into the camera more frequently", "you are shaking your head in a negative fashion", "You are rolling your eyes whenever Bob speaks", or "try to relax before responding" accordingly.

Another application of the present invention is to record and plot emotional states over time in order to better understand personal emotional trends and what is a "normal" expression for a given individual. By distributing expressions along at least one pre-determined emotional vector determined by the defining plurality of visually perceptible facial expressions, each of which correspond to an emotional state, individual profiles and norms can be determined. People who may by culture, ethnicity, custom, and/or personal experience tend to look more intense and serious or more relaxed and carefree as a normal neutral expression and the system uses that information to recalibrate the expression analysis to bias the emotional characterization considering the normal expression for a given individual. The system may 'grade' photos automatically for an appropriate emotional expression for consumer use and enjoyment of the image. Automatic sorting of subjects' emotional states allowing the incorporation of photographer preferences (smiling, no smiling), cultural norms, and commercial requirements (such as passport, identification, etc.) can also be deployed for emotional expression based capture, tagging, utilization, searching, and/or storage. Accordingly, embodiments may be used to provide non-clinical indications of mood related to events and embodiments may be able to adjust for seasonal mood variations and links to particular events (e.g., being happy around the holidays, loving summer and the outdoors, happiest when fishing, sad/neutral at family holiday events). Further, such plotting of images across various vectors can assist in establishing a normal neutral for an individual that may be compared across different times, seasons, events, etc.

Creative applications of the present invention use emotional states and anatomical features to automatically order, sequence, and/or edit images to create pleasing arrangements for still, dynamic, and/or interactive presentations. A user selects preferred emotional states for inclusion and ordering of those states, the images are scaled and corrective image processing is applied to harmonize the images and incorporate those images in output product such as a derivative video snippet, single image, or multi-image collage. Presenting a group of images in response to a user selection from range of emotional expressions can be further delineated by various levels of, or whether the emotion is; positive or negative, conscious or unconscious, active or passive, or pleasant or unpleasant.

For example, in a family or personal image collection that contains images of family members and friends with close emotional bonds and relationships there is the possibility to search for "reminiscence" images by combinations of "emotional expression", "event type", "subject age differential", "the recipient's current emotional state, event, condition", and the "presenter's intent". For instance, a user may search for a purpose of "cheering up a loved one on a sad anniversary." For example, if a beloved dog passed away a year ago, the dog's owner may post on a social network that she misses her dear pet and she's feeling blue. Her Mom may be able to search a large image collection that features many images of her adult daughter and her dog to find images of her daughter with happy expressions in photos that feature her dog.

In another example, a friend of someone having a stressful time may wish to "cheer up" the stressed out individual. However, a conventional ecard or greeting card, may not convey an appropriate or helpful uplifting sentiment, or may appear too impersonal, corny, hackneyed, banal, or cliched, such as with the overused image of a kitten hanging from a tree limb by its front paws with the caption, "Hang in there baby", which, due to its overuse, could be perceived as insensitive or even as sarcasm. The concerned individual can search the image collection for images of the individual using a "happy, joyous, or elated expression" search criteria. The user would be presented with a visual list of images of the individual with happy expressions ordered by expression intensity along with optional chronological list or event grouping filters or lists. The user could select the desired image and captions would be suggested such as; "Happy times", "Remember when?", "What a day", "Great party" and so forth or the user can add a personal comment.

In addition to natural human emotional response and expressions, there are also "artificial" or "staged" expressions intended to convey or elicit an emotional condition or response, such as attempting to make someone laugh with a humorous, whimsical, or sarcastic expressions. This has been a common practice throughout the long history of photography and included; looking "cross-eyed", "sticking out your tongue", and "rolling your eyes" in order to create a humorous or irreverent photograph. Today, these types of expressions have been further popularized by the "selfie" which has been enabled by the addition of display side cameras on most phones and easy sharing options on social networks and photo-centric applications such as Facebook™ and Instagram™. The growing number of specific selfie expression types are a testimony to their popularity. These expression types and have become so popular that they are identified with "hash tags" such as with #duckface. Examples of the various types of selfie expressions that have emerged, include; "Duck Face" which involves pressing lips together in an exaggerated pout while simultaneously sucked in your cheeks. This pose is usually intended as an attempt to appear alluring, but can also be used as a self-deprecating, ironic, sardonic, and/or satirical gesture making fun of the pose. The "Fish Gape" includes sultry gaze with an open-mouthed and teeth slightly exposed, "Kissy Face" includes puckered-up lips as in preparation to administer a kiss, "Brow Too Strong Face" includes one eye brow lifted, tilted head, and slightly pouty lips. "Model Pout" a less exaggerated version of "Duck Face" or "Kissy Face", "Smize" or "smiling with your eyes" features a closed-mouth almost smile, head tilted down slightly and eyes looking up. "Squinch" is created when the eyes are slightly squinted, as if looking into the sun. "Ussie" a selfie of a couple. "Groupie" is a selfie of large group of people, with one member of the group holding the phone with an extended arm. These specific practiced expressions can also be automatically identified and characterized by measuring the positions of facial feature points and as such the system can provide guidance in mimicking these artificial expressions.

Embodiments of the present invention may incorporate a processor that is programmed to recognize these artificial expressions by mapping the user's facial feature points and use the mapped features to identify the expression in a user's personal photo collection, when recording images, or used to assist a user in producing a selected artificial expression, such as selecting "Duck Face" from a menu, and providing the user with audio visual instructions on how to reproduce the expressions such as; "pout more", "suck in your cheeks", "tilt you head slightly forward", and "look upward", etc. The previous discussion centered on still images but the present invention is also applicable to video clips and recordings. Video can be used to produce still images from frame extraction and video can be used to present dynamic facial expressions.

In addition, as new artificial expressions become popular the system software can be updated to include the ability to recognize, identify, tag, record, and/or instruct the user how to exhibit these expression types. Alternatively, the user selects an optional "learning mode" associated with the system where she can demonstrate the expression and provide an expression name and/or description so the system can identify that expression type in the future. As such, in some embodiments, machine learning and other neural network based techniques may be implemented to train a computer to identify and classify different expressions using the measured and recorded facial features for each image in light of reference facial features of a user and/or a group of users.

FIG. 1 illustrates a block diagram of a system 10 for recognizing, ordering, and presenting images according to one or more expressions. A user 20 may interact with a user interface 30 configured to interface with a data processing system 70. The user interface may be coupled with or in communication with a display 40, an image input system 50 and an image output system 60.

The data processing system 70 may include a facial feature point analyzer 80, a facial expression emotional vector sequencer 110, a facial feature point alignment calculator 120, a reference facial recognition facial feature point look up table (LUT) 90, a reference facial expression facial feature point look up table (LUT) 100, and a data storage system 130 including an image collection 140 and corresponding image metadata 150.

The facial feature point analyzer 80 may be configured to analyze one or more images stored in the image collection 140 to identify and extract facial feature points from the one or more images. The facial expression emotional vector sequencer 110 may be configured to compare the identified facial feature points to the reference facial recognition facial feature point look up table to identify a subject face of the one or more images. Further, the facial expression emotional vector sequencer 110 may be configured to use the reference facial expression facial feature point look up table to identify an emotional expression score for an image across a variety of emotional vectors. For example, the emotional vectors may include active-passive, pleasant-unpleasant, positive-negative, and/or conscious-unconscious. Each of the images may be provided a score for each of the emotional vectors that are used to categorize and order the images across the one or more emotional vector scores.

Different embodiments for converting facial feature point measurements into corresponding emotional expressions include, for example, comparing the measured feature points to models of incremental feature point variations each tagged to represent different expressions, using comparison models that were trained by human observers, and/or measuring the relative positions of the facial feature points to a determined neutral facial expression for a given individual. Any of the aforementioned techniques can be augmented by human observers with remote access to the images in near real time that are either employed by the service provider or via crowd sourced observers. The general workflow of the method of the present invention, whether embodied in an image capture system, and image processing API, and/or an image processing application, is provided with information correlating facial feature point positions with emotional expressions.

Visually perceivable facial expressions are characterized by measurements and analysis of the relative positions, orientations, and shapes of at least the following facial features: eyes, eye brows, eye lids, forehead/brow, nostrils, and/or mouth. These measurements are used to order and rank images to be arranged for presentation in response to user-selected emotional expression or range of emotional expressions and presenting the selected arranged set of digital images on a display device.

For example, a closed mouth with no upturned corners, eyes that are opened but not opened widely and un-dilated nostrils indicate a neutral emotional expression which can be used as a reference or associated with a model of a neutral expression with similar features and proportions. As the corners of the mouth turn up, the mouth and eyes open more the level of emotional expression increases from neutral, to "pleased", to "amused", to "happy", "joyous", "ecstatic", and so forth in relation to the relative positions, orientations, and shapes of the facial features measured as compared to a neutral expression.

Recognizing people based on their appearance is well known to one skilled in the art, so facial images representing the same individual can be grouped and then ordered and ranked based on a user-selected emotional expression or range of emotional expressions. The face detection, facial feature point detection and measurements of the relative positions, orientations, and shapes of: eyes, eye-brows, eye lids, forehead/brow, nostrils, and/or mouth are performed using the same feature point detectors.

The facial feature point alignment calculator 120 may be configured to identify and align the facial features of the subject across one or more images. For example, the facial feature point alignment calculator may measure the ocular distance and location and align the underlying images to share a similar facial angle, location, and size of the eyes and/or mouth of the subject between images.

The reference facial recognition facial feature point look up table (LUT) 90 may include a reference facial feature point for each subject of an image in the image collection 140. As such, when the facial features of a subject face in an image is identified, recorded, and processed, the facial feature map may be compared to a variety of stored reference facial recognition facial feature points associated with the facial features that have previously been analyzed and associated with particular users and/or subjects by the data processing system 70. Accordingly, the recorded facial features of the unknown subject may be compared to the reference facial feature point look up table to identify the subject from the previously recorded facial feature points stored by the data storage system 130.

The data storage system 130 may include an image collection 140 and corresponding image metadata 150 to the image collection 140. Metadata, generally, encompasses data that is stored and associated with a media asset. This includes recorded, or previously recorded, metadata, which is recorded by the capture device—e.g., capture time, date, and location provided by a digital camera. Metadata also encompasses user-provided metadata, such as that provided via a user interface located on the image capture device or via an image editing application interface that may be accessed through a remote computer. Lastly, metadata encompasses derived metadata, such as metadata computed by face detection or event classification algorithms that are applied to media assets post-capture.

Figure 2:
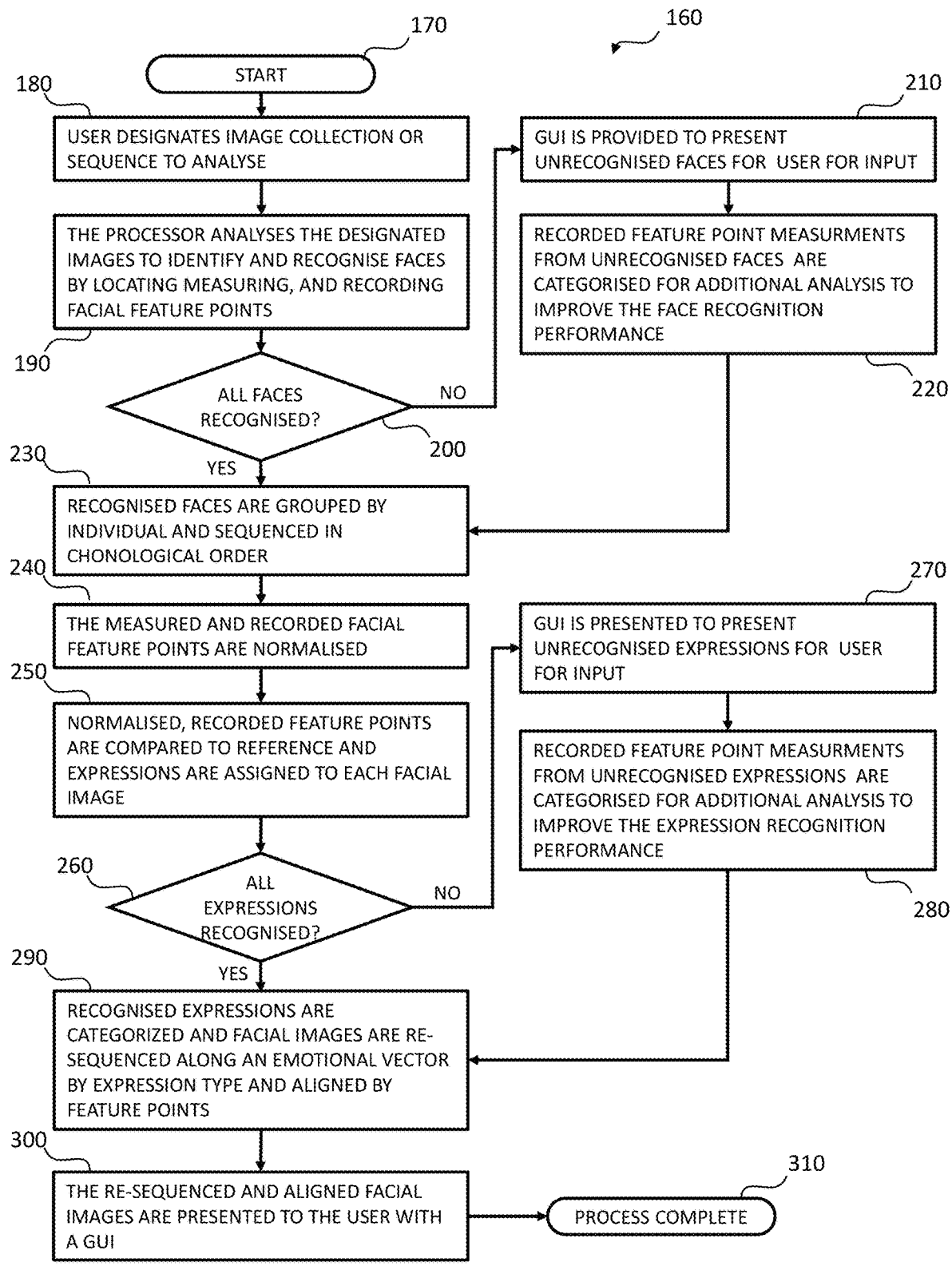
FIG. 2 illustrates a flow diagram of a method of processing images in a library to identify expressions and ordering the images by one or more emotional vectors by expression type according to an embodiment of the present invention.

FIG. 2 illustrates a flow diagram 160 of a method of processing images in a library to identify expressions and ordering the images by one or more emotional vectors by expression type according to an embodiment of the present invention. For example, at step 170 the process is initialized by a user opening an application and/or otherwise initiating an image expression ranking and ordering operation. At step 180, a user designates an image collection or sequence of images to analyze. At step 190, the processor analyses the designated images to identify and recognize faces by locating, measuring, and recording facial feature points within each of the images. The facial feature points may include eyes, mouth, nostrils, nose, eyebrows, and/or any other specific and/or recognizable facial features of the subject within the images. At step 200, the processor determines if all the faces are recognized within the library or sequence of pictures. At step 210, if all the faces are not recognized, a graphical user interface (GUI) is provided to present unrecognized faces to the user for input regarding who those persons are. At step 220, the recorded feature point measurements from the unrecognized faces are categorized for additional analysis to improve the facial recognition performance in the future.

At step 230, all the faces are recognized or the user provides additional feedback regarding the unrecognized faces and the processor groups the recognized faces by subject individuals and sequences the images in chronological order. At step 240, the measured and recorded facial feature points from the recognized faces are normalized for each of the individuals. At step 250, the normalized, recorded feature points are compared to reference facial feature points for each of the identified individuals and expressions are assigned to each facial image. A reference facial expression facial feature point look up table (LUT) 100 may be queried for each individual to obtain the reference facial features for each of the individuals. The reference facial expression facial feature point look up table 100 may store a normalized reference facial feature location and spacing for each individual to allow the system to compare the recorded facial feature points in reference to each individual. At step 260, the processor may perform the expression assignment for each of the images within the image library and determine whether all the expressions are recognized for all the images. At step 270, if any expressions are not recognized, a GUI may be presented to the user to allow the user to provide feedback regarding the expression that is unrecognized. At step 280, the recorded feature point measurements from the unrecognized expressions are categorized for additional analysis to improve the expression recognition performance in the future. At step 290, the recognized expressions are categorized and facial images are re-sequenced along any emotion vector by expression type and aligned by feature points. The images may be sequenced across multiple different emotion vectors (e.g., active vs. passive, positive vs. negative, etc.) as described herein. At step 300, the re-sequenced and aligned facial images may be presented to the user within one or more graphical user interfaces. Some exemplary graphical user interfaces are provided and described in further detail herein. Accordingly, at step 310, the process is complete and a new set or library of images may be analyzed.

Figure 3:
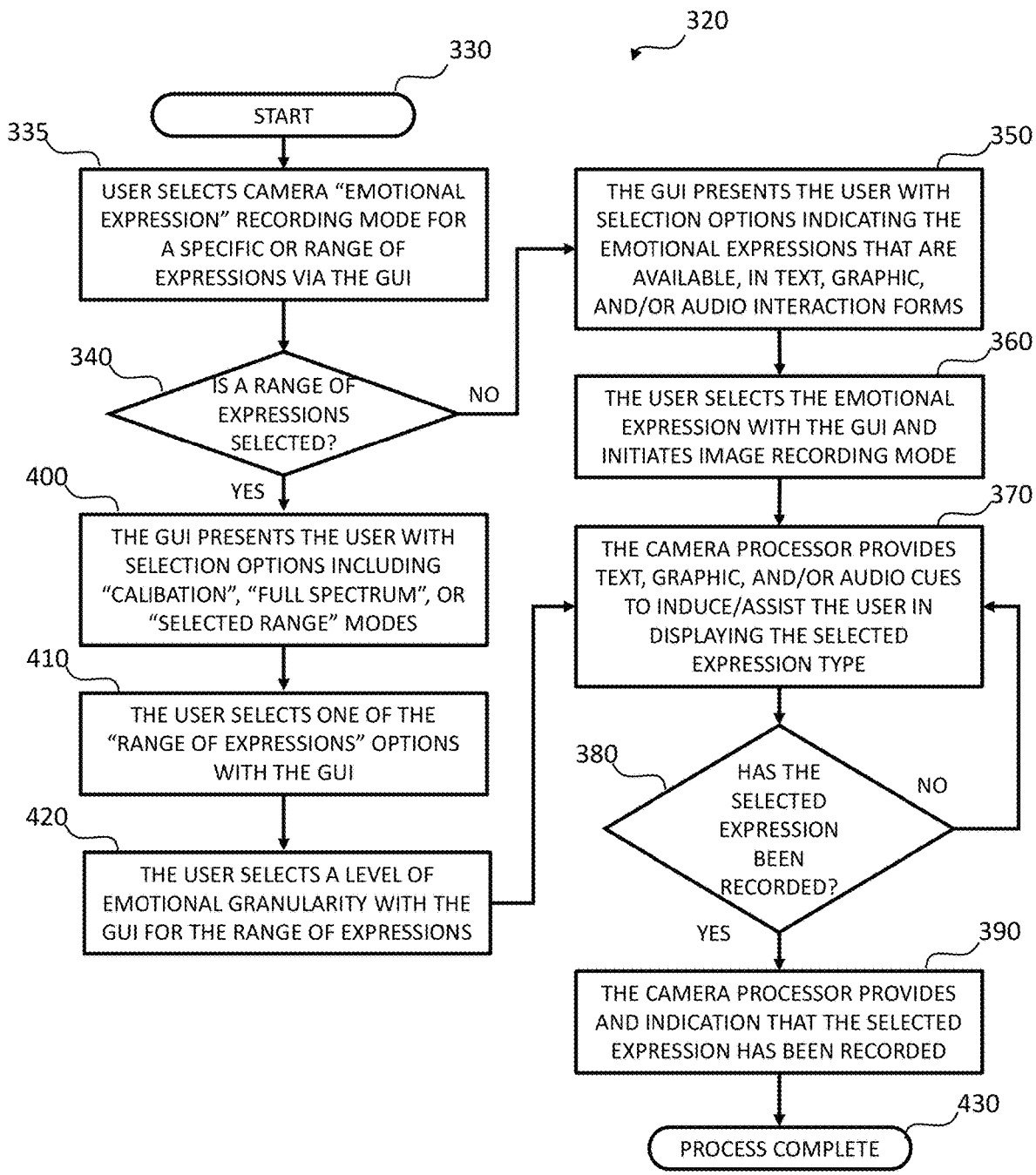
FIG. 3 illustrates a flow diagram of a method of capturing a range of emotional expressions of a subject according to an embodiment of the present invention.

FIG. 3 illustrates a flow diagram 320 of a method of capturing a range of emotional expressions of a subject according to an embodiment of the present invention. For example, a user may use a kiosk or camera of a mobile device or other electronic device to capture a range of different emotional expressions/states of a user for presentation in a number of different graphical user interfaces or products as will be described in further detail herein. At step 330, a user may initiate the start of a method. At step 335, the user selects an "emotional expression" recording mode for a specific or range of expressions via a graphical user interface of the camera, kiosk, mobile device, mobile application, or other electronic device configured to capture images of a subject. At step 340, the processor determines whether a range of expressions is selected as an input option. At step 350, if the range of expressions is not selected, a graphical user interface presents the user with selection options indicating the emotional expressions that are available in text, graphically, and/or through audio interaction forms through the device. At step 360, the user selects the emotional expression within the GUI and initiates an image recording mode to capture one or more images of the current expression of the user.

Alternatively, at step 400, if a range of expressions are selected at step 340, the GUI presents the user with selection options including "calibration," "full spectrum," or "selected range" modes to allow the user to select which type of range of expressions they would like captured. At step 410, the user selects one of the range of expressions displayed by the GUI. At step 420, the user selects a level of emotional granularity with the GUI for the range of expressions that instructs the processor as to the number of different expressions to prompt the user to exhibit.

At step 370, whether the user selected a range of expressions or a single expression, the camera processor provides text, graphic, and/or audio cues to instruct or induce the user into displaying the selected expression type. At step 380, the processor determines whether the selected expression has been recorded. If not, step 370 is repeated with additional instructions being provided until the processor determines that the target expression has been captured. If the expression has been captured, at step 390, the camera processor provides an indication that the selected expression has been recorded and the system may be move onto the next expression or may be finished as shown in step 430.

Any number of different expressions may be used along with corresponding instructions for matching those expressions. For example, artificial expressions (e.g., a duckface expression) may be coded into instructions along with traditional expressions (e.g., happy, beaming, etc.). Thus, embodiments allow a system to compare real-time image of user along an emotional vector and provide specific instructions to the user to have the user meet an expression reference image. A reference expression may be stored that may allow the system to identify whether the user's facial features match the reference expression and instructions for that image in line with the reference neutral expression of the user to incorporate the normal expression of the user in line with cultural and historical norms for the user.

Figure 4:
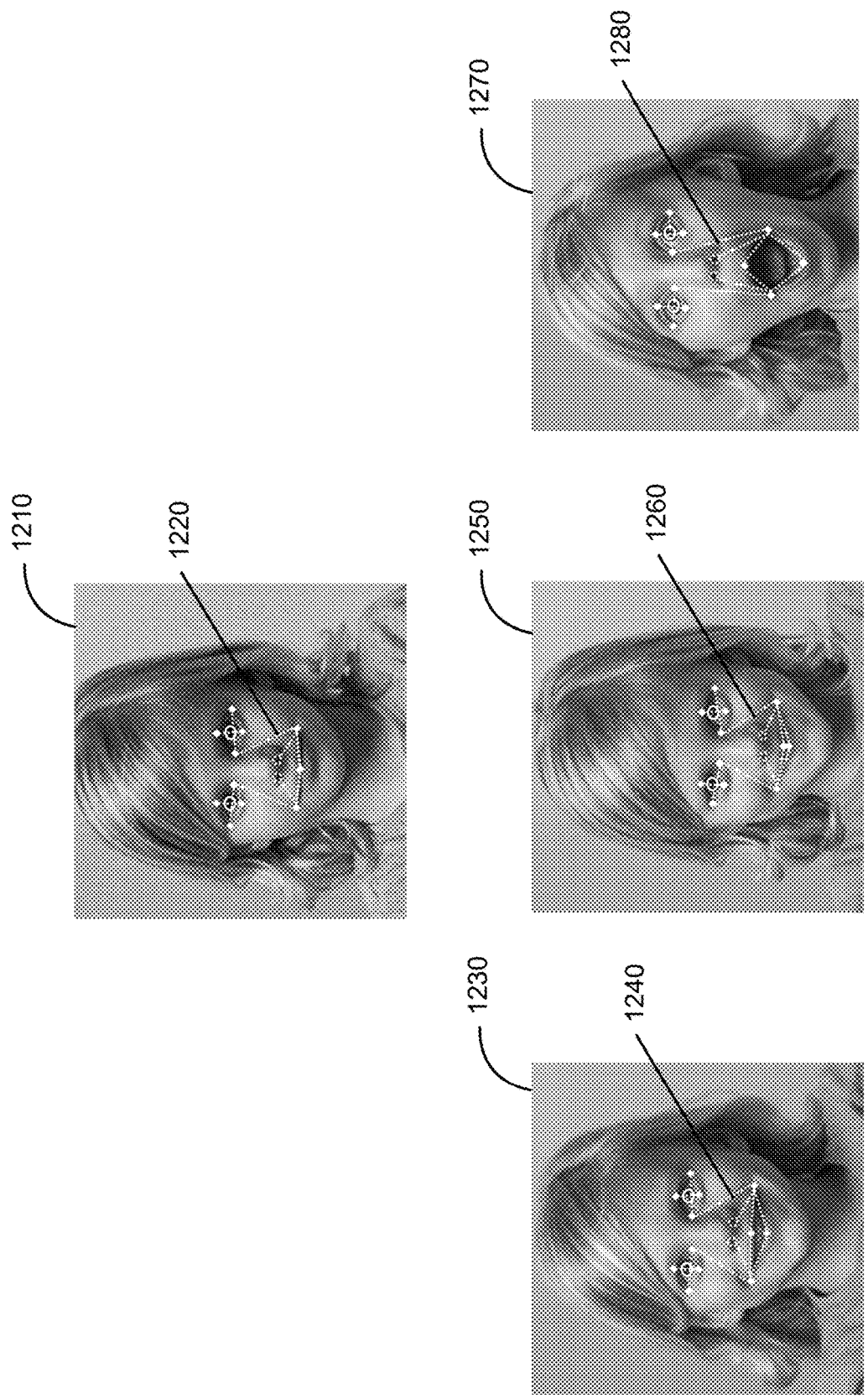
FIG. 4 illustrates an example graphic depicting a neutral emotional expression/state versus a series of positive expressions and/or emotional states according to an embodiment of the present invention.

FIG. 4 illustrates an example set of graphics 1210, 1230, 1250, and 1270 depicting a neutral emotional expression/state versus a series of positive expressions and/or emotional states according to an embodiment of the present invention. As shown in FIG. 4, the top image 1210 shows an example of a "forward facing pose—neutral expression" that may be used as a reference facial feature to compare to the other expressions that will fall along the "positive" and "active" expression axes. As can be seen in the figures, the facial features including eye position, nostril position, mouth outline, and relative positions between those features are measured and compared to the neutral positions of the facial features to classify the expressions along the positive and/or active emotional state axis. For example, the facial features 1220 measured and recorded in the neutral image will be compared to the measured locations of the facial features of images 1230, 1250, and 1270. The distances between the various facial features are compared along with their relative locations and used to identify and classify the images against the various emotional vectors. Accordingly, image 1230 shows the subject expression along a vector showing from happy to excited progression from left to right.

Accordingly, the graphics illustrate examples of feature point measurements for; eye gaze direction (circles in pupils) measured against the horizontal points at the eye corners (illustrated by the "diamond shaped graphics") and the vertical points indicating the openness of the eyelids and their shape. When combined, these measurements can mathematically represent the visually observable expressive nature of human eyes. The mouth and nostril shapes and relative positions are measured (relative position and shape measurements are illustrated with "dotted line graphics") along with eye/mouth shape and eye/mouth degree of openness. The feature point measurements from each available image are compared to each other to establish a "scale of emotional expression" for a selected individual. The ranges of these measured shapes and relative positions for a selected individual are matched to a series of feature point models that are correlated to the range of human expressions. Missing expressions contained within the selected images can be created by selecting an available image that is close to the desired expression and warping the facial featuring points to conform to the model for that selected expressing with any well know digital image editing software.

Facial feature point measurements are normalized for head pitch, yaw, and roll relative to the optical axis of the capture device as described in U.S. Pat. No. 9,369,625 titled "SYSTEM FOR PRODUCING COMPLIANT FACIAL IMAGES FOR SELECTED IDENTIFICATION DOCUMENTS," filed Aug. 12, 2014, which is hereby incorporated by reference in its entirety for all purposes. The U.S. Pat. No. 9,369,625 patent describes techniques for measuring human facial feature points when the face is off axis to the capture device. This can be used to compensate for "off-axis" expression feature point measurements. Bi-lateral ear symmetry, glasses, jewelry, apparel, hats, and certain hair styles and hair-part position can also indicate a forward facing facial pose. Further, the emotional expressions may be determined from measurements of the relative positions of facial feature points from a determined neutral expression positions. Feature point measurements compared/mapped to generic expression models for smiles, frowns, eye brow positions, to determine happiness anger, fear, joy, etc.

Using a forward facing image of a selected subject with a neutral expression to establish and normalize measurement parameters for an individual may allow the system to generate a reference image that may be used to calibrate the rest of the emotional states obtained by the system. For example, a reference image may be culturally neutral—face at rest, and thus, not expressing emotion. This can be compared to a model image or a saved user image. For example, a "neutral expression" may be determined for neutral positions of an individual's facial feature points and the relative positions are measured against those neutral positions. All humans have the same emotional expressions but public displays of emotion and responses to interpersonal interactions and situations vary radically by culture. For instance, certain cultures may tend to be more reserved and/or stoic. Such cultures tend to feel and view anything beyond subtle public emotional expression, whether positive or negative, as immature and inappropriate. In contrast, other culture may have more expressive, unreserved, and familiar style of emotional expression. The present invention would optionally include; "ethnic, regional, cultural, religious parameters" via automated and/or user selection options.

These cultural parameters may be automatically applied to calibrate a normal or typical emotional response range for the individual over time and/or from a collection of photos, and for given events and situations. Ethnicity, regional location, religious affiliation, etc. can be automatically determined/predicted from image analysis and location data and/or provided via a brief profile provided by the user. For example, a rule in the system would more heavily weigh small changes and subtle variations in facial feature point positions and expect a lower frequency of expressing a "broad smile" for a middle aged Chinese man living in Beijing. As a result, the system would increase the "granularity of emotional expressions" for that individual in order to provide more images for use in presentations and image products. In addition, subtle changes in expression would, for instance, be more likely appreciated and culturally appropriate for an individual from a culture with more muted expressions on average (e.g., a middle aged Chinese man).

Figure 5:
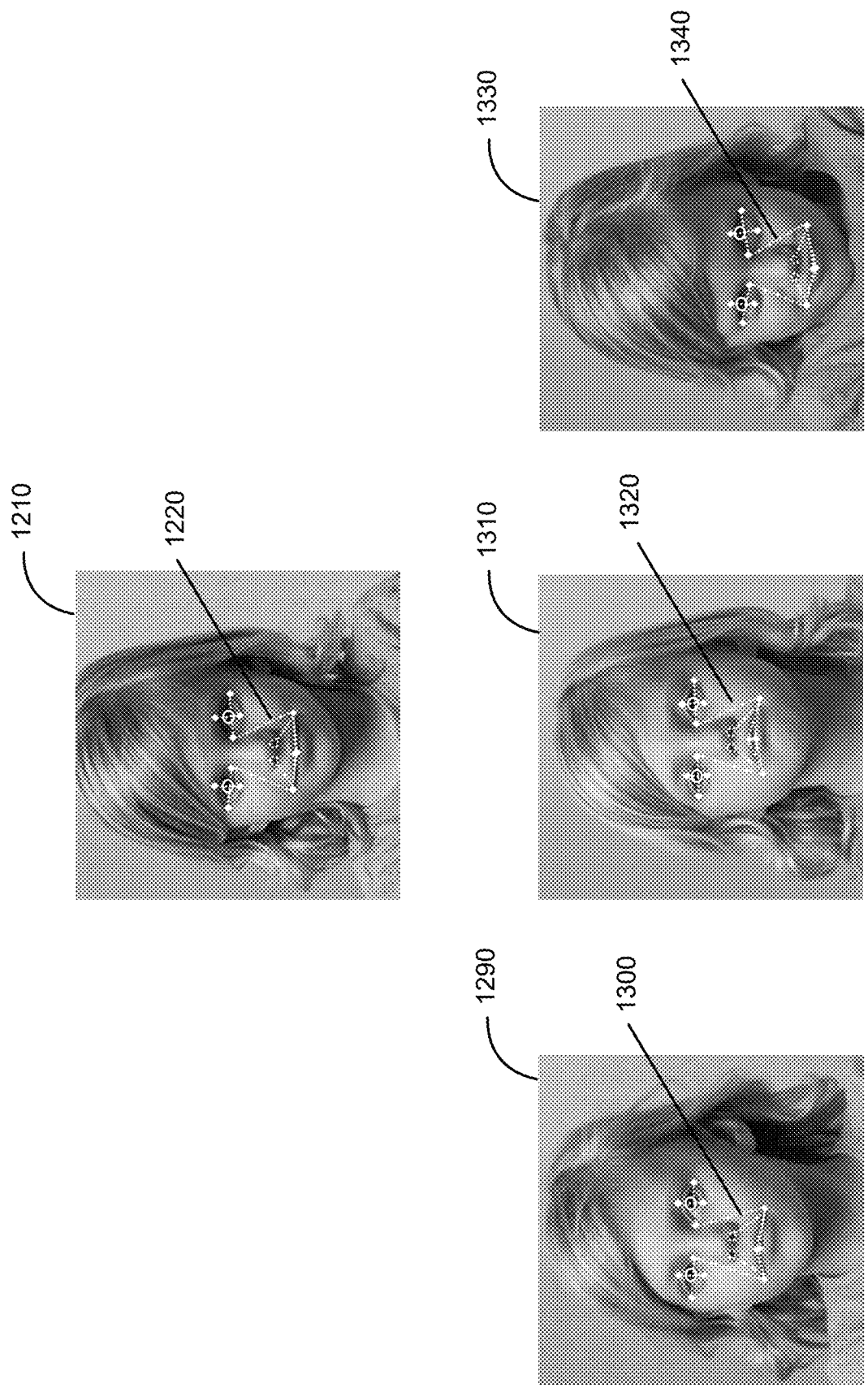
FIG. 5 illustrates an example graphic depicting a neutral emotional expression/state versus a series of negative emotional expressions/states according to an embodiment of the present invention.

FIG. 5 illustrates an example graphic depicting a neutral emotional expression/state 1220 versus a series of negative emotional expressions/states 1300, 1320, 1340 according to an embodiment of the present invention. Similar to FIG. 4, the exemplary graphics shown in FIG. 5 illustrate the identified and measured facial features 1300, 1320, and 1340 and how they relate to reference facial features 1220 of a neutral front view of the subject 1210. However, FIG. 5 shows an example of a "Forward Facing Pose—Neutral Expression" (top) and a row along a sad—angry progression (an opposite end of the emotional vector scale "negative" and "active"). Although only two emotional vectors are shown in FIGS. 4 and 5, any combination of the four described (active/passive, positive/negative, pleasant/unpleasant, conscious/unconscious) emotional vectors can be used to rank, order, identify, or characterize an individual or series of emotional states.

Figure 6:
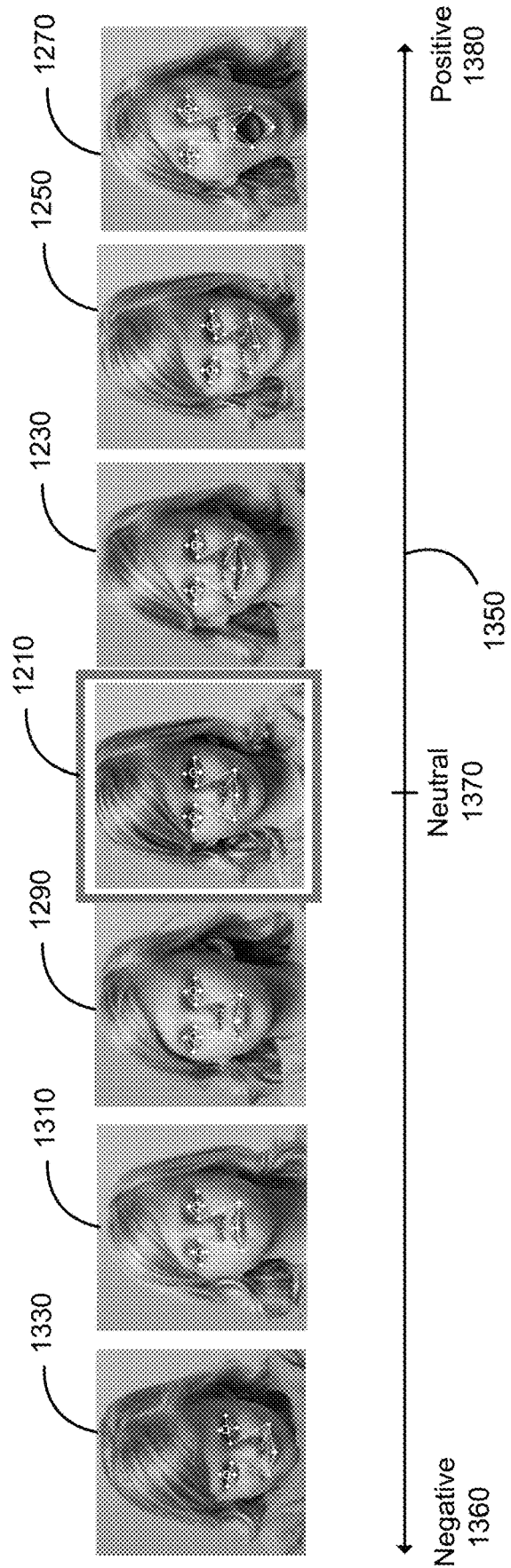
FIG. 6 illustrates an example emotional vector scale from negative to positive with corresponding images of a subject having captured expressions along the negative to positive emotional vectors according to an embodiment of the present invention.

FIG. 6 illustrates an example emotional vector scale from negative to positive with corresponding images of a subject having captured expressions along the negative to positive emotional vectors according to an embodiment of the present invention. For example, FIG. 6 shows an example of an entire emotional vector scale from negative to positive/pleasant to unpleasant with neutral indicated in the center. Text indications of the represented emotional states of images may include (from left to right) Angry (1330), Sad (1310), Melancholy (1290), Neutral (1210), Pleased (1230), Happy (1250), and Elated (1270). As shown by the negative 1360 to positive 1380 emotional vector 1350, the images may be ordered and sequenced according to the expressions identified in each of the images and presented along the negative to positive emotional vector space 1350 with a neutral expression 1210 being placed in the center of the emotional vector space 1350.

Figure 7:
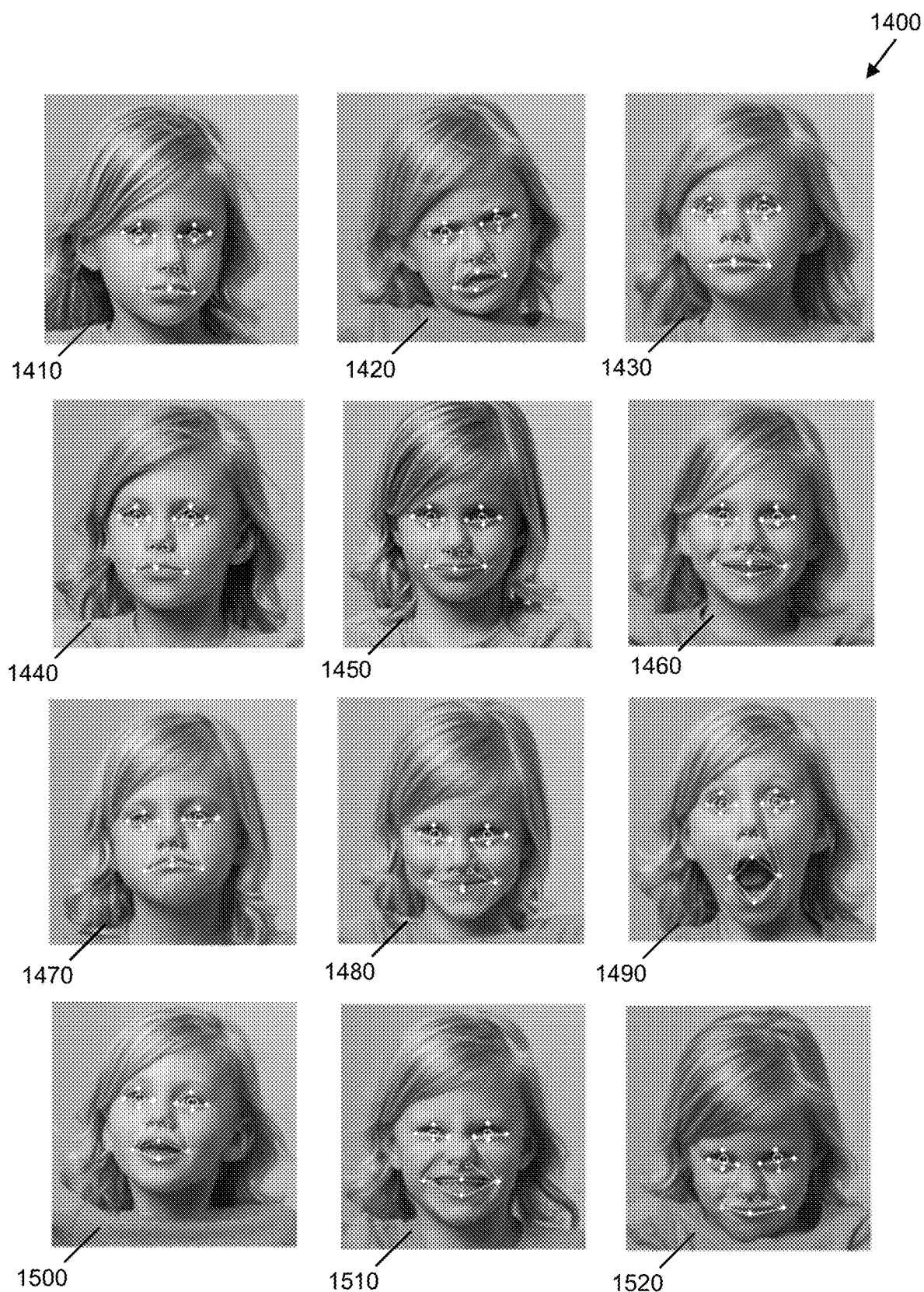
FIG. 7 illustrates an example of a randomized arrangement of identified emotional states according to an embodiment of the present invention.
Figure 10A:
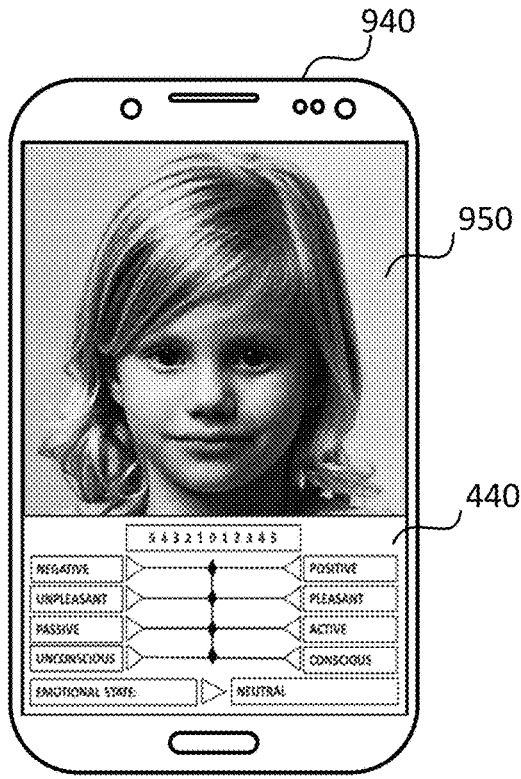
FIGS. 10A-10D illustrate a mobile device with a user image and an exemplary graphical user interface (GUI) depicting a variety of emotional expressions/states according to an embodiment of the present invention.
Figure 10B:
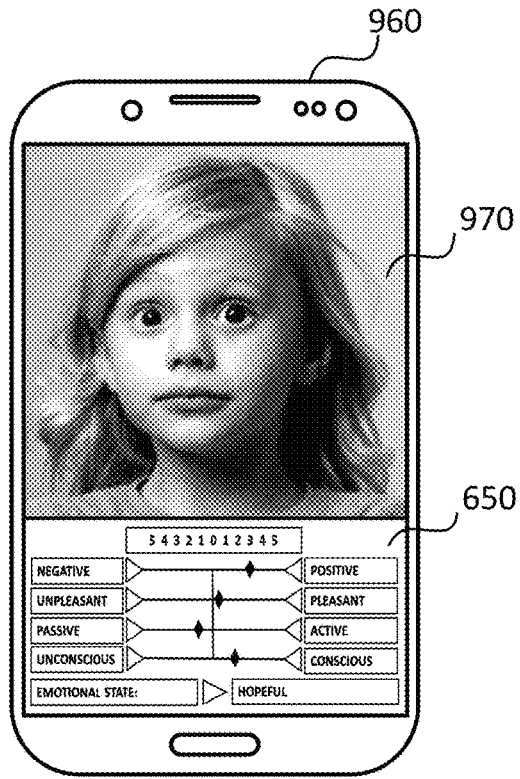
Figure 10C:
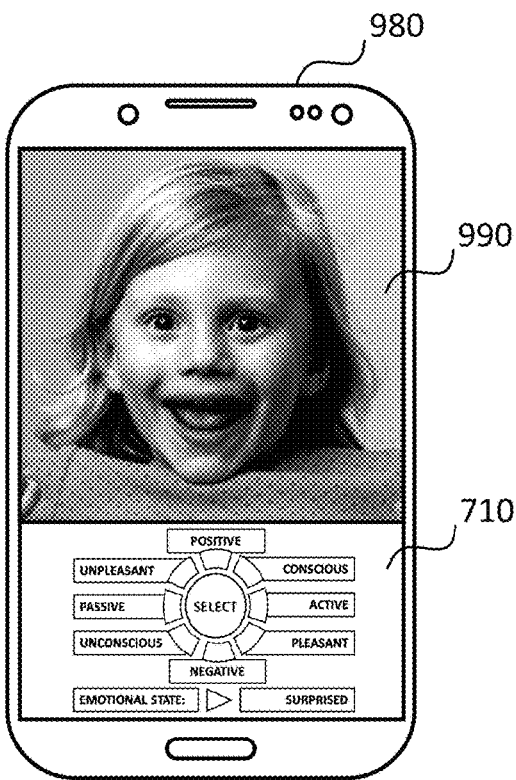
Figure 10D:
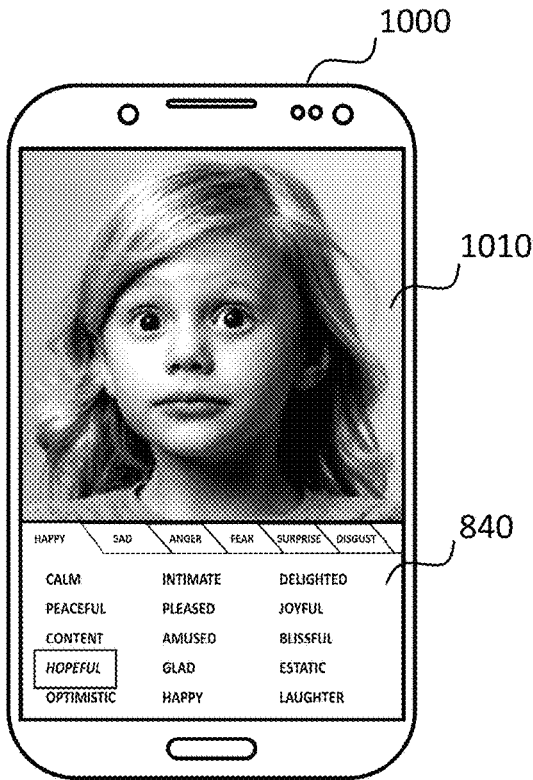
Figure 11A:
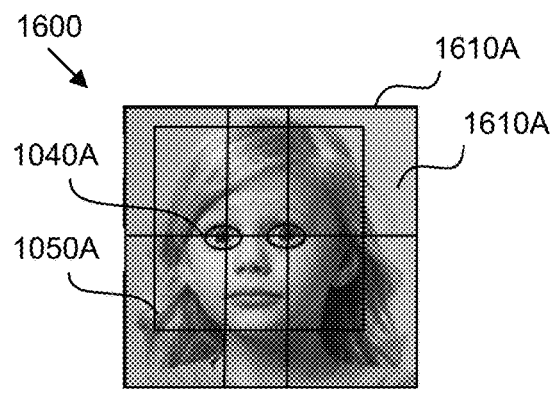
FIGS. 11A-11D show an image processing flow diagram for a first image of a user having a first emotional expression/state according to an embodiment of the present invention.

FIG. 7 illustrates an example of a randomized arrangement of identified emotional states captured in different images 1410-1520 according to an embodiment of the present invention. The example of a randomized arrangement of identified emotional states includes the following identified expressions (from left to right and top to bottom): Focused (1410), Confused (1420), Eager (1430), Melancholy (1440), Neutral (1450), Pleased (1460), Sad (1470), Happy (1480), Elated (1490), Contemplative (1500), Determined (1510), and Petulant (1520). Accordingly, an interesting and expressive collection of different expressions of a subject may be identified, ordered, and presented in an embodiment of the present invention.

Facial expressions can be used to convey an emotion or to elicit an emotional response. Thus, embodiments of the present invention allow the user to navigate along a chosen emotional vector and to select a facial image with the desired expression. This can be accomplished with any standard GUI technique such as, swiping left or right and/or up and down, using drop down menus, or selecting the desired image from a linear or area display of multiple images in representing an emotional vector. Alternatively, the user can select the desired facial expression from a menu of text based emotional descriptors such as; "pleased", "optimistic", "satisfied", "complete", "glad", "contented", of "fulfilled", for example. In addition, the user can use emoji characters in addition to or instead of text as a means to locate a desired matching facial expression.

FIG. 8A illustrates an exemplary user interface 440 depicting a neutral emotional expression/state across various emotional vectors according to an embodiment of the present invention. As can be seen in FIG. 8A, the neutral expression has emotional scores along a variety of different emotional state vector axes 480, 520, 560, and 600 that may be indicated by the scoring interface indicators 490, 530, 570, and 610 displayed along the various axes. The negative-positive emotional state axis 480 may display the emotional state scores of images from negative 470 to positive 460 along the axis 480. Similarly, the unpleasant-pleasant emotional state axis 520 may display the emotional state scores of images from unpleasant 510 to pleasant 500 along the axis 520. Further, the passive-active emotional state axis 560 may display the emotional state scores of images from passive 550 to active 540 along the axis 560. Finally, the unconscious-conscious emotional state axis 600 may display the emotional state scores of images from unconscious 590 to conscious 580 along the axis 600. Based on the various scores across the various axes, an emotional state 620 may be determined and presented to the user. For example, in FIG. 8A, the emotional state is neutral and the scores for the various emotional state axes are neutral with a score of 0. The scoring guide 450 is presented above the various axes to allow a user to identify a magnitude of an emotional expression along each of the various emotional axes 480, 520, 560, and 600.

FIG. 8B illustrates an exemplary user interface 650 depicting a hopeful emotional expression/state 700 across various emotional vectors 480, 520, 560, and 600 according to an embodiment of the present invention. As can be seen in FIG. 8B, the hopeful emotional state 620 is determined based on the scores of the image across the variety of emotional state vectors, negative-positive 480, unpleasant-pleasant 520, passive-active 560, and unconscious-conscious 600. For example, the hopeful state includes an image that has a high positive score, a moderate pleasant score, a moderate passive score, and a somewhat higher conscious score. Further, if the user changes any of the relevant scores, the system may calculate a new emotional state and display an image corresponding to the updated new emotional state.

FIG. 9A illustrates another exemplary user interface 710 depicting a surprised emotional expression/state 830 across various emotional vectors according to an embodiment of the present invention. The navigation user interface allows a user to push various buttons in order to cycle through the images in that emotional vector. For example, a user may select the active vector interface button 760 to view more active expressions as the user browses through a library and/or set of images. For instance, the user may push the active vector interface button three times, the unconscious button once, and hit the select button 800, and the system will find and display an image associated with that vector score. In addition, a "more like this option" (not shown) can be included to find similar expressions to the expression currently being viewed.

FIG. 9B illustrates another exemplary user interface 840 depicting a hopeful emotional expression/state across various emotional vectors according to an embodiment of the present invention. The GUI of FIG. 9B incorporates "multiple functionality" in that the same controls can select a facial expression for a selected individual from a graphic and/or textual list and then search the user's image collection for the matching expression. The same GUI can be used to analyze a facial photo that the user selects to determine the subject's expression. Additionally, embodiments of the present invention may analyze a captured image and compare its score to a score of a desired facial expression selected by the user and then the GUI may instruct the user to adjust her expression to conform to the selected expression.

FIGS. 10A-10D illustrate a mobile device with a user image and an exemplary graphical user interface (GUI) depicting a variety of emotional expressions/states according to an embodiment of the present invention. As can be seen, the GUIs of FIGS. 8A-9B can be displayed on the bottom portion 440, 650, 710, and 840 of a mobile device 940, 960, 980, and 1000 while an image 950, 970, 990, and 1010 corresponding to the selected vector score is displayed above the GUI. Accordingly, a user can browse their catalog of images according to identified, ranked, and ordered images by expression.

FIGS. 11A-11D show an image processing flow diagram 1600 for a first image 1610A of a user having a first emotional expression/state according to an embodiment of the present invention. The processing flow begins by identifying the location of the face in the image and generating a grid 1050A surrounding the face of the subject. The grid 1050A may be based on the ocular position 1040A of the face. The grid 1050A may have a predetermined size that may crop the surrounding portions of the image that do not fall into the size to ensure that all images may be uniformly presented through the interface. The size of the grid may be based on identified facial features (e.g., location of ears and/or an identified head size) and/or may be predetermined to ensure consistent and uniform images are presented.

Figure 11B:
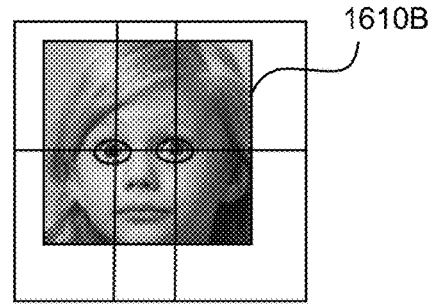
Figure 11C:
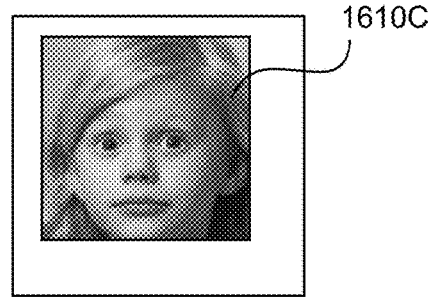
Figure 11D:
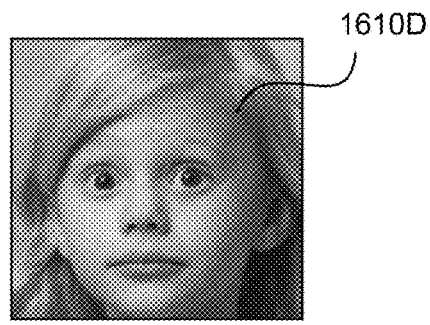

FIG. 11B shows a cropped image 1610B based on the size of the grid. The placement of the grid is based on the ocular position of the subject's eyes 1040A. The surrounding image area outside of the grid is cropped from the image. FIG. 11C shows a cropped image 1610C with the grid removed. FIG. 11D shows a zoomed or expanded image 1610D to fill the presentation space that will be displayed for the image.

Figure 12A:
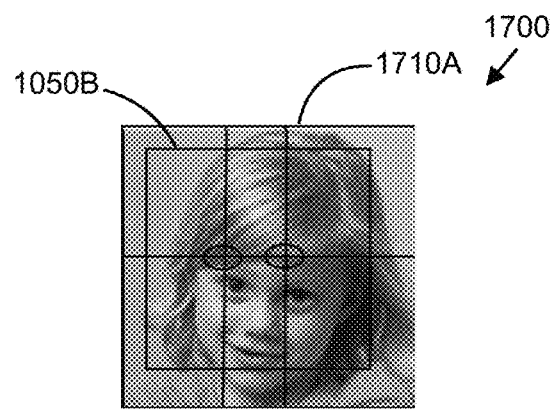
FIGS. 12A-12D show an image processing flow diagram for a second image of a user having a second emotional expression/state according to an embodiment of the present invention.
Figure 12B:
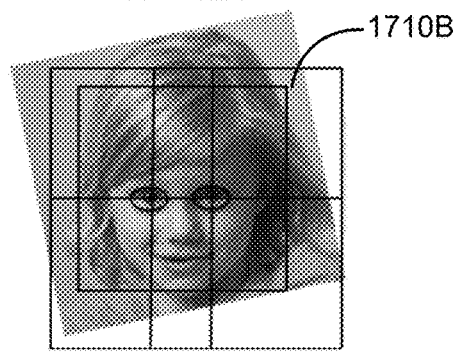
Figure 12C:
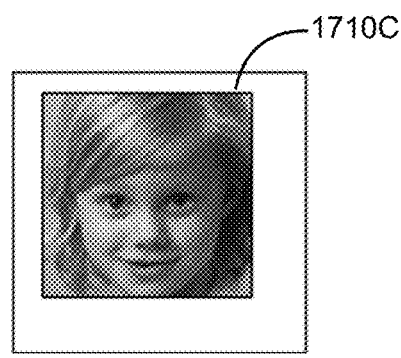
Figure 12D:
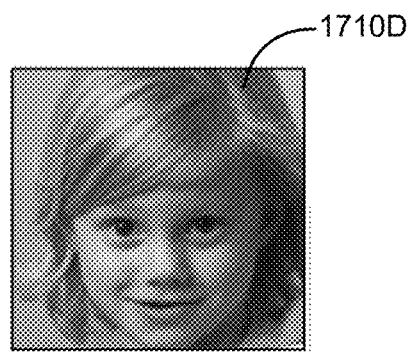

Similarly, FIGS. 12A-12D show an image processing flow diagram 1700 for a second image 1710A of a user having a second emotional expression/state according to an embodiment of the present invention. FIG. 12A shows the grid 1050B being identified based on the first image and overlaid on the second image 1710A. FIG. 12B shows the image where the ocular position of the face in the image 1710B is identified and the image is rotated to line up with the ocular grid of the first image 1610B. Accordingly, the ocular placement of the two images may be aligned to ensure a consistent presentation between images. FIG. 12C shows the image 1710C after the area outside of the grid is cropped. FIG. 12D shows the expanded/zoomed version of the second image with similar ocular positioning and distance between the two images of the subject.

By cropping and expanding the image to fill the presentation space, the ocular position and spacing of the various images can be consistent across multiple images. During presentations of faces transitioning from one to another ocular separation and position of the various images in is important to allow for smooth transitions. Thus, the images may be zoomed and rotated to allow for alignment across images. Accordingly, across multiple images, the eyes are the same distance apart and have a relatively similar position in the image. As such, as multiple images are browsed and/or displayed through a user interface, the images will shift naturally because the eyes of the subject will match in position and rotation. If these steps are not performed, the hardcopy/prints and softcopy/video of transitions between images will be distracting from image to image.

For presentation of multiple images in a sequence, or in a linear or matrix layout, individual images can be aligned to each other within their individual frames. By aligning facial feature points, adjusting head tilt, and increasing or decreasing magnification to match ocular separation from image to image, a series of images can be presented in rapid succession and the image to image transitions will appear smooth and natural. This can also be enhanced by provided subtle transitional fade-ins and fade-outs between images. This technique can be used for navigation and for static and/or dynamic presentation.

Figure 13A:
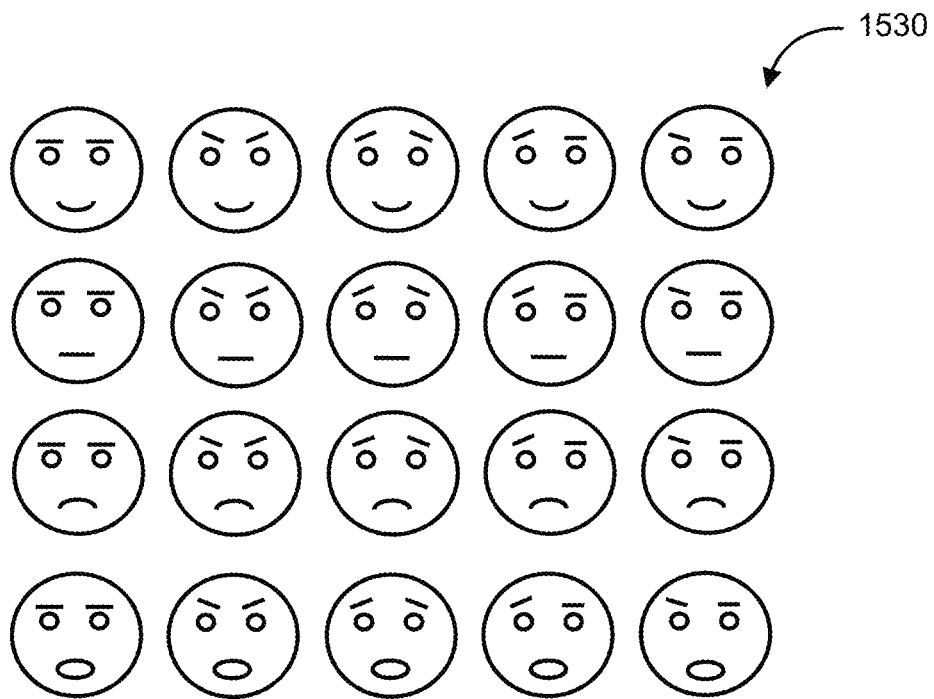
FIGS. 13A-13B show reference emoticons and an embodiment of the present invention that generates custom emojis/emoticons with different emotional expressions/states across a subject according to an embodiment of the present invention.
Figure 13B:
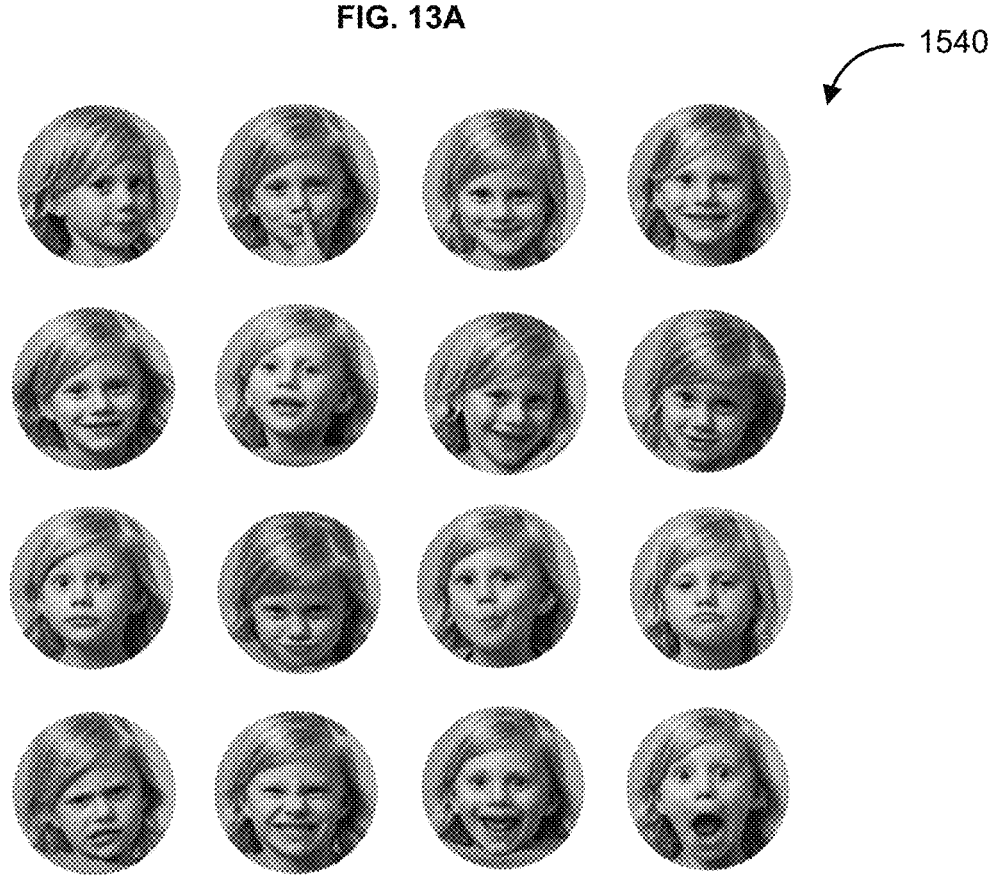

FIGS. 13A-13B show reference emoticons 1530 and an embodiment of the present invention that generates custom emojis/emoticons with different emotional expressions/states across a subject 1540 according to an embodiment of the present invention. The term "emoji" is Japanese for "picture characters" and are similar to emoticons but go beyond expressing emotion. Emojis include a large set of symbols and icons used to express an idea or emotion over various electronic communication systems. Therefore, some emoji are emoticons, but not all emoticons are emoji. Emoticons and emoji are both used with email and instant messaging systems and were both created to help facilitate emotional intent, tone, and personality into online text based conversations. Today with powerful handheld and portable devices and high speed wireless and cellular networks, the need for a low resolution or text approximated image with a minuscule data profile is no longer mandatory.

In addition, emoticons and emoji are indexed so that a user can select the exact emotional state she wishes to convey. However, these very simple visual cues do help to convey complex and subtle emotional states but lack the personal aspects of true images of individuals with a personal connection or relationship. Both emoticons and emoji can be used to convey an emotional reaction or intent. To further enhance the emotional currency personal facial images can be used in place of text and/or graphics based icons. For example, a young mother with a 3-year-old toddler can create a set of "personal emoticons" of her child's face engaged in various emotional expressions and use them to respond and comment on social networks.

Figure 14:
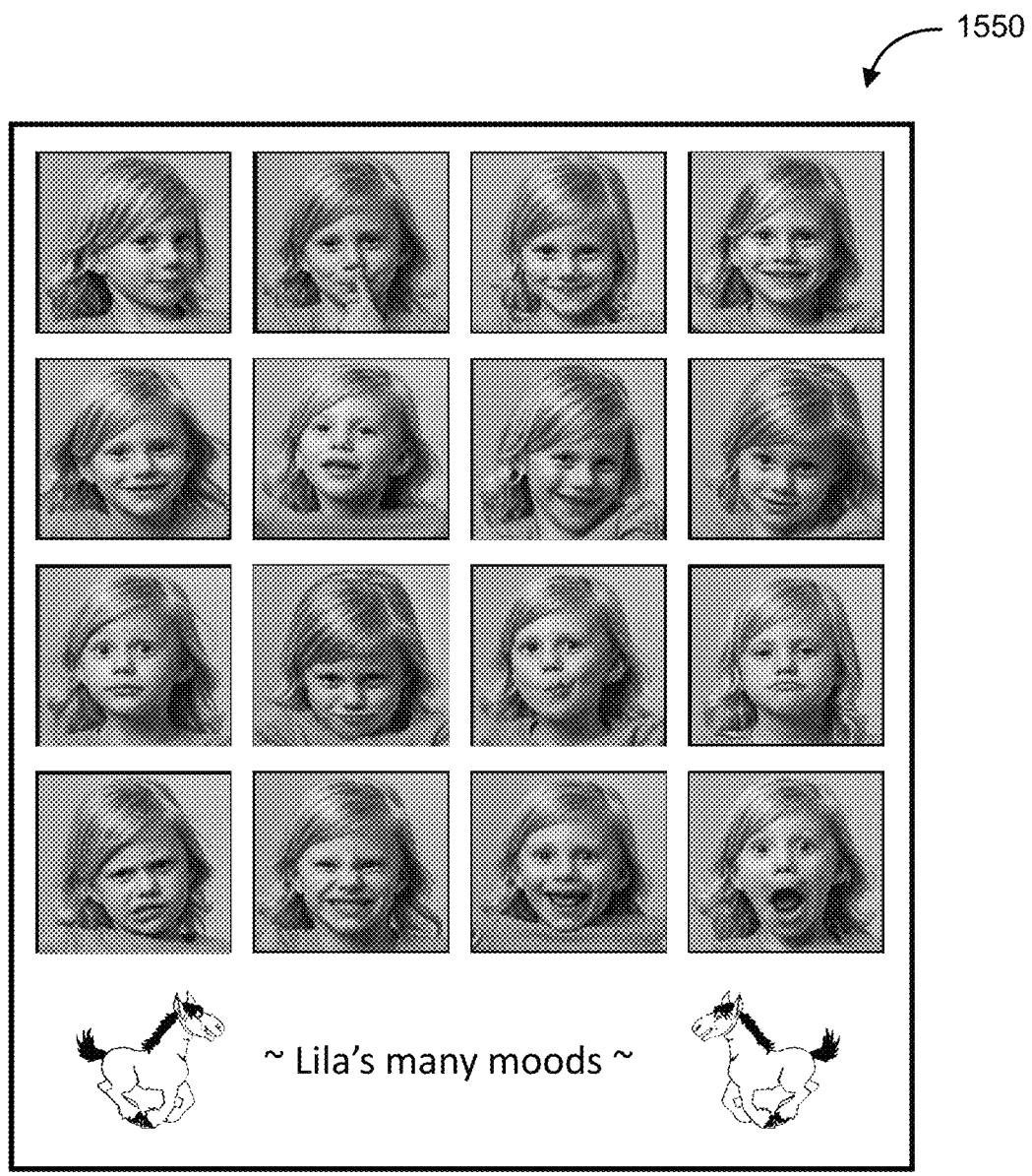
FIG. 14 shows an exemplary presentation format for a randomized collection of emotional states of a subject according to an embodiment of the present invention.

FIG. 14 shows an exemplary presentation format 1550 for a randomized collection of emotional states of a subject according to an embodiment of the present invention. Many different types of products and/or applications may be provided by embodiments of the present invention. For example, the images may be printed on a card or greeting card as shown in FIG. 14. Applications may include printed and virtual photo products and greeting cards, e-cards, re-sequenced emotional vector progression video clips, interactive virtual presentations, emotional progression navigation GUIs, real image emoticons, interactive user expression guides, linear and/or matrix arrayed facial images arranged by user selected emotional vectors such as; happy to sad, calm to angry, randomly distributed, and so forth.

Figure 15A:
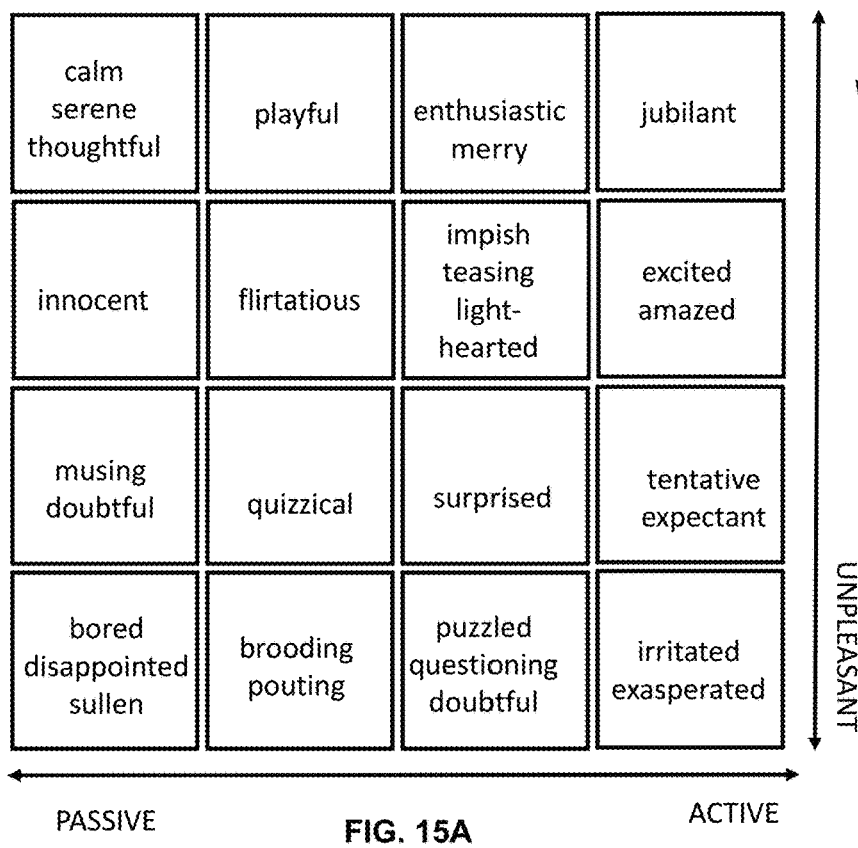
FIGS. 15A-15B show an exemplary emotional state presentation template according to two emotional vectors and selected images associated with a presentation template according to an embodiment of the present invention.
Figure 15B:

FIGS. 15A-15B show an exemplary emotional state presentation template 1560 according to two emotional vectors and selected images associated with a presentation template according to an embodiment of the present invention. In different embodiments, a series of images may be provided along a single axis, dual axis, or multiple axes with one or more different emotional vector spaces and/or planes involved in the selection and presentation of expressions across those single to multiple axes. FIG. 15A show a series of different emotional expressions that may be organized along a two emotional vector space including passive-active along the horizontal axis and pleasant-unpleasant along the vertical axis. Additional emotional states and alternative emotional vectors are provided below in the attached Appendices. FIG. 15B shows an exemplary state presentation product 1570 showing images of the subject with the corresponding emotional states shown in the template 1560 of FIG. 15A.

Additionally, in some embodiments, different biological responses may be used to measure emotional expressions and responses. For example, in some embodiments, techniques such as Eulerian Video Magnification (EVM) could be included be used in live capture imaging systems and video recordings include facial blood flow patterns and pulse measurement to assist in determining an emotional state. As such, in some embodiments, metadata related to images may include blood pressure, sensor information, and/or any other information that may allow the system to identify and present different emotional states across images.

The invention has been described in detail with particular reference to certain embodiments thereof, but it will be understood that variations and modifications can be effected within the spirit and scope of the invention.

PARTS LIST
Parts List:

10. System Block Diagram
20. User
30. User Interface
40. Display
50. Image Input System
60. Image Output System
70. Data Processing System
80. Facial Feature Point Analyzer
90. Reference Facial Recognition Facial Feature Point Look Up Table
100. Reference Facial Expression Facial Feature Point Look Up Table
110. Facial Expression Emotional Vector Sequencer
120. Facial Feature Point Alignment Calculator
130. Data Storage System
140. Image Collection Datastore
150. Image Metadata Datastore
160. Method Flowchart
170. Initialization Step
180. Image Collection Selection Step
190. Facial Feature Identification and Recognition Step
200. Facial Recognition Step

| EMOTIONAL STATES AND ALTERNATIVE EMOTIONAL VECTORS | | | |
|---|---|---|---|
| abandoned | despair | humored | pessimistic |
| acceptance | determined | hurt | petrified |
| adoration | devastated | hyper | pity |
| affection | disappointed | hysterical | playful |
| aggravated | discouraged | indignation | pleased |
| agitated | disgust | infatuation | pleasure |
| aggressive | disheartened | infuriated | possessive |
| alert | dismal | inner peace | pride |
| amazed | dispirited | innocent | provoked |
| ambitious | distracted | insanity | proud |
| amused | distressed | insecure | puzzled |
| anger | dopey | insecure | rage |
| animosity | down | inspired poem | regretful |
| annoyed | dreadful | interest | relief |
| anticipation | dreary | intimidated | remorse |
| anxiousness | eager | invidious | resentment |
| appreciative | ecstatic | irate | resignation |
| apprehensive | embarrassed | irritability | resolved |
| ardent | detest | irritated | re |
| aroused | empathic | jaded | sadness |
| ashamed | emptiness | jealousy | satisfied |
| astonished | enchanted | joy | scared |
| attraction (sexual) | enigmatic | jubilant | schadenfreude |
| attraction (intellectual) | enlightened | kind | scorn |
| attraction (spiritual) | enraged | lazy | selfish |
| awed | enthralled | left out | sensual |
| betrayed | enthusiastic | liberated | sensitive |
| bewildered | envy | lively | sexy |
| bitter | euphoric | loathsome | shame |
| bliss | excited | lonely | sheepish |
| blue | exhausted | longing | shocked |
| boastful | expectation | love | shy |
| bored | exuberance | lovesick | sincerity |
| breathless | fascinated | loyal | solemn |
| bubbly | fear | lust | somber |
| calamitous | flabbergasted | mad | sorrow |
| calm | fight-or-flight | mean | sorry |
| camaraderie | foolish | melancholic | spirited |
| cautious | frazzled | mellow | stressed |
| cheerful | frustrated | mercy | strong |
| cocky | fulfillment | merry | submissive |
| cold | furious | mildness | superior |
| collected | gay | miserable | surprised |
| comfortable | giddy | morbid | sweet |
| compassionate | gleeful | mourning | sympathetic |
| concerned | gloomy | needed | temperamental |
| confident | goofy | needy | tense |
| confused | grateful | nervous | terrified |
| contempt | gratified | obscene | threatened |
| content | greedy | obsessed | thrilled |
| courageous | grief | offended | tired |
| cowardly | grouchy | optimistic | tranquil |
| crafty | grudging | outraged | troubled |
| cranky | guilty | overwhelmed | trust |
| crazy | happy happy2 | pacified | tormented |
| cruelty | hate | pain | uncertainty |
| crummy | heartbroken | panicky | uneasiness |
| crushed | homesick | paranoia | unhappy |
| curious | hopeful | passion | upset |
| cynic | hopeless | pathetic | vengeful |
| dark | horrified | peaceful | vicious |
| dejected | hostile | perturbation | warm |
| delighted | humiliated | | weary |
| delirious | | | worn-out |
| denial | | | worried |
| depression | | | worthless |
| desire | | | wrathful |
| | | | yearning |
| | | | zesty |
| HATE VECTOR | | EXCITED VECTOR | |
| Irritated | | Antsy | |
| Resentful | | Perky | |
| Miffed | | Nervous | |
| Upset | | Bouncy | |

| EMOTIONAL STATES AND ALTERNATIVE EMOTIONAL VECTORS | |
|---|---|
| Mad | Aroused |
| Furious | Energetic |
| Raging | Ecstatic |
| FEAR VECTOR | JOY VECTOR |
| Tense | Pleased |
| Nervous | Optimistic |
| Anxious | Satisfied |
| Jittery | Complete |
| Frightened | Glad |
| Panic Stricken | Contented |
| Terrified | Fulfilled |
| SAD VECTOR | LOVE VECTOR |
| Down | Soft |
| Blue | Kind |
| Moody | Touched |
| Grieved | Sympathetic |
| Dejected | Warm Hearted |
| Depressed | Loving |
| Heart Broken | Intimate |

The invention claimed is:

1. A digital image processing system, comprising:
a computer processor configured to rank and order digital images, and a display device configured to display the digital images according to the rank and order, wherein the computer processor ranks and orders the digital images by:
receiving a designation of a digital image collection from a user, wherein the digital image collection comprises digital images;
detecting each face of each individual depicted in the digital images by locating and measuring facial feature points of each face within the digital images and comparing the measured facial feature points with a reference facial recognition facial feature point look up table comprising reference facial feature points associated with each face depicted in the digital image to identify each face of the digital images;
determining when all faces depicted in the digital images have been detected;
separating the digital images into groups by subject individuals based on the detected faces of each individual in the digital images;
normalizing the measured facial feature points for each face of each individual depicted in the digital images;
comparing the normalized facial feature points to the reference facial feature points for each individual identified by the reference facial recognition facial feature point look up table depicted in the digital images and assigning an expression to each individual in each of the digital images based on the comparison, wherein comparing the normalized facial feature points to the reference facial feature points comprises calculating emotional expression scores across a plurality of emotional state vectors by comparing the normalized facial feature points to a reference facial expression facial feature point look up table, and wherein the reference facial feature points are stored in the reference facial expression facial feature point look up table for each individual comprising measurements of relative positions and orientations of one or more features selected from the group comprising: eyes, eyebrows, eye lids, forehead/brow, nostrils, and mouth;
presenting, to the user, digital images with unrecognized expressions to receive feedback on the unrecognized expressions of the digital images from the user;
categorizing recorded feature point measurements from the digital images with unrecognized expressions with the feedback provided by the user to improve future emotional expression score calculations;
re-sequencing the groups of digital images grouped by subject individuals, wherein re-sequencing arranges the digital images in each group based on the expression assigned to the subject individual for each group along an emotional state vector; and
presenting the re-sequenced groups of digital images to the user via the display device.

2. The digital image processing system of claim 1, wherein the display device is configured to display digital images in a static, dynamic, or navigable manner, in a linear, sequential, two-dimensional (2D), or three-dimensional (3D) format.

3. The digital image processing system of claim 1, wherein the computer processor is further configured to plot the subject individual's emotional expressions over time for each of the groups of digital images.

4. The digital image processing system of claim 1, further comprising a user selection interface and wherein the display device is incorporated as a graphic overlay, chatbot, API, or website application on a phone, tablet, or retail kiosk.

5. The digital image processing system of claim 1, wherein the computer processor is further configured to re-sequencing the groups of digital images based on a human operator visually perceivable facial expression determination process.

6. The digital image processing system of claim 1, wherein the re-sequenced groups of digital images are presented according to a presentation format selected from the group comprising: random, sequential, chronological, a single axis presentation, dual axis presentation, or multiple axis presentation.

7. The digital image processing system of claim 1, wherein presenting the re-sequenced groups of digital images comprises presenting textual terms or icons reflecting general emotional selection option categories.

8. The digital image processing system of claim 1, wherein presenting the re-sequenced groups of digital images includes presenting on the display device a "more like this" option.

9. The digital image processing system of claim 1, wherein detecting each face of each individual depicted in the digital images comprises using a processing technique selected from the group comprising: face detection, feature extraction, and face recognition.

10. The digital image processing system of claim 9, wherein the feature extraction technique is selected from the group comprising: multilayer perceptron (MLP), radial basis function network (RBFN), support vector machine (SVM), and rule based classifiers to classify visually perceivable facial expressions.

11. The digital image processing system of claim 6, further comprising a graphic user interface configured to receive a user selection of a presentation format.

12. The digital image processing system of claim 1, wherein the computer processor is configured to modify the digital images for use as emoticons, emoji, or avatars.

13. The digital image processing system of claim 1, wherein the computer processor is further configured to use visually perceivable facial expressions to trigger an image capture device or to tag an image in real time.

14. The digital image processing system of claim 1, wherein the computer processor is further configured to selectively change a visually perceivable facial expression by digitally modifying one or more of the positions, orientations, or shapes of a feature selected from the group comprising: eyes, eye brows, eye lids, forehead/brow, nostrils, and mouth.

15. The digital image processing system of claim 1, wherein the computer processor is further configured to replicate selected facial images and selectively change a visually perceivable facial expression to fill in gaps in expressions types or to enhance emotional granularity.

* * * * *